(12) United States Patent
Sagong et al.

(10) Patent No.: US 9,077,605 B2
(45) Date of Patent: Jul. 7, 2015

(54) APPARATUS AND METHOD FOR SUPPORTING TIME-QUADRATURE AMPLITUDE MODULATION IN A WIRELESS COMMUNICATION SYSTEM

(71) Applicant: Samsung Electronics Co., Ltd., Gyeonggi-do (KR)

(72) Inventors: Min Sagong, Gyeonggi-do (KR); Chi-Woo Lim, Gyeonggi-do (KR); Sung-Nam Hong, Gyeonggi-do (KR); Hyun-Kyu Yu, Gyeonggi-do (KR); Kyung-Whoon Cheun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/166,769

(22) Filed: Jan. 28, 2014

(65) Prior Publication Data

US 2014/0211887 A1    Jul. 31, 2014

(30) Foreign Application Priority Data

Jan. 28, 2013    (KR) .................... 10-2013-0009256

(51) Int. Cl.
*H04L 27/02* (2006.01)
*H04L 27/34* (2006.01)

(52) U.S. Cl.
CPC .................... *H04L 27/3444* (2013.01)

(58) Field of Classification Search
USPC .................. 375/268, 269, 271, 273, 322, 323
See application file for complete search history.

(56) References Cited

U.S. PATENT DOCUMENTS

| 5,406,584 | A  | * | 4/1995 | Erisman ........................ 375/272 |
| 7,697,565 | B2 |   | 4/2010 | Golitschek et al. |
| 2003/0145036 | A1 | * | 7/2003 | Hartmann et al. ............ 709/201 |
| 2008/0232510 | A1 |   | 9/2008 | Golitschek Edler Von Elbwart et al. |
| 2010/0211842 | A1 |   | 8/2010 | Moon et al. |
| 2012/0002753 | A1 |   | 1/2012 | Annavajjala et al. |

FOREIGN PATENT DOCUMENTS

WO    WO2010/095780 A1    8/2010

OTHER PUBLICATIONS

International Search Report dated May 20, 2014 in connection with International Patent Application No. PCT/KR2014/000765, 4 pages.
International Written Opinion dated May 20, 2014 in connection with International Patent Application No. PCT/KR2014/000765, 4 pages.

* cited by examiner

*Primary Examiner* — Kevin Kim

(57) ABSTRACT

A method for supporting Time-Quadrature Amplitude Modulation (TQAM) in a wireless communication system includes generating a transmission symbol identified by a combination of a QAM symbol and a position of a time resource to which the QAM symbol is mapped, shifting at least one QAM symbol among QAM symbols contained in the transmission symbols with respect to a time axis, and readjusting a constellation point of the QAM symbol on the basis of a shifting quantity. A method for operating a receive end comprises receiving a reception symbol identified by a combination of a QAM symbol and a position of a time resource to which the QAM symbol is mapped, restoring at least one QAM symbol shifted in a transmit end for uniformizing of the time-axis distribution of QAM symbols contained in the reception symbols, generating decoding metrics for the reception symbol, and performing decoding the reception symbol using the decoding metric.

34 Claims, 15 Drawing Sheets

APPARATUS AND METHOD FOR SUPPORTING TIME-QUADRATURE AMPLITUDE MODULATION IN A WIRELESS COMMUNICATION SYSTEM

PRIORITY

The present application is related to and claims priority under 35 U.S.C. §119(a) to a Korean Patent Application filed in the Korean Intellectual Property Office on Jan. 28, 2013 and assigned Serial No. 10-2013-0009256, the contents of which are herein incorporated by reference.

TECHNICAL FIELD

The present invention relates to modulation and demodulation of a signal in a wireless communication system.

BACKGROUND

Generally, a signal processing process of a transmission side for wireless communication is accomplished by channel coding, modulation, frequency up conversion, and transmission. Corresponding to this, signal processing of a reception side is accomplished by frequency down conversion, demodulation, and channel decoding. Here, the demodulation of the reception side includes a process of calculating a per-bit or per-symbol decoding metric. Generally, a Log Likelihood Ratio (LLR) is widely used as the decoding metric.

Generating the LLR requires premising a specific probability distribution for an interference and noise signal. To perform decoding with low complexity, the conventional art assumes a Gaussian distribution of an interference signal. Accordingly, to approximate a characteristic of the interference signal to the Gaussian distribution to the maximum, a modulation method of a Quadrature Amplitude Modulation (QAM) series is being mainly used. But, it has been widely known that a non-Gaussian channel has a bigger channel capacity than a Gaussian channel. Therefore, if decoding is properly performed, the non-Gaussian channel can provide greater decoding performance than the Gaussian channel.

According to this, there is a need for the development of a modulation method of enabling an interference signal to follow a non-Gaussian distribution.

SUMMARY

To address the above-discussed deficiencies, it is a primary object to provide an apparatus and method for supporting a modulation/demodulation technique of enabling a noise and interference signal to follow a non-Gaussian distribution in a wireless communication system.

Another aspect of the present invention is to provide an apparatus and method for solving a problem of symbol concentration of a time axis when applying a Time-Quadrature Amplitude Modulation (TQAM) technique in a wireless communication system.

A further aspect of the present invention is to provide an apparatus and method for calculating a Gaussian decoding metric having a low TQAM complexity in a wireless communication system.

Yet another aspect of the present invention is to provide an apparatus and method for calculating a non-Gaussian decoding metric approximating to a TQAM channel capacity in a wireless communication system.

The above aspects are achieved by providing an apparatus and method for supporting time-quadrature amplitude modulation in a wireless communication system.

According to one aspect of the present invention, an operation method of a transmit end in a wireless communication system is provided. The method includes the operations of generating a transmission symbol identified by a combination of a Quadrature Amplitude Modulation (QAM) symbol and a position of a time resource to which the QAM symbol is mapped, shifting at a time axis at least one QAM symbol among QAM symbols included in the transmission symbols, and readjusting a constellation point of the QAM symbol on the basis of a shift value indicating a shifted quantity.

According to another aspect of the present invention, an operation method of a receive end in a wireless communication system is provided. The method includes the operations of receiving a reception symbol identified by a combination of a QAM symbol and a position of a time resource to which the QAM symbol is mapped, restoring at least one shift that has been performed in a transmit end for uniformizing of the time-axis distribution of QAM symbols included in the reception symbols, generating decoding metrics for the reception symbol, and performing decoding using the decoding metric.

According to a further aspect of the present invention, a transmit end apparatus in a wireless communication system is provided. The apparatus includes a modem and a Radio Frequency (RF) transmission unit. The modem generates a transmission symbol identified by a combination of a QAM symbol and a position of a time resource to which the QAM symbol is mapped, shifts at a time axis at least one QAM symbol among QAM symbols included in the transmission symbols, and readjusts a constellation point of the QAM symbol on the basis of a shift value indicating a shifted quantity. The RF transmission unit transmits a signal.

According to a yet another aspect of the present invention, a receive end apparatus in a wireless communication system is provided. The apparatus includes a reception unit and a modem. The reception unit receives a reception symbol identified by a combination of a QAM symbol and a position of a time resource to which the QAM symbol is mapped. The modem restores at least one shift that has been performed in a transmit end for uniformizing of the time-axis distribution of QAM symbols included in the reception symbols, generates decoding metrics for the reception symbol, and performs decoding using the decoding metric.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

Below, the present invention describes a technology for supporting modulation/demodulation technique of enabling a noise and interference signal to follow a non-Gaussian distribution in a wireless communication system.

As a modulation method of enabling an interference signal to follow a non-Gaussian distribution, a Frequency-Quadrature Amplitude Modulation (FQAM) technique has ever been proposed. The FQAM is a hybrid modulation method combining Quadrature Amplitude Modulation (QAM) and Frequency Shift Keying (FSK). The FQAM has all advantages of high spectral efficiency of the QAM, an interference signal of a non-Gaussian distribution of the FSK and the like. The concept of the FQAM technique is described as in FIG. 1 below.

FIG. 1 illustrates the concept of the FQAM technique. FIG. 1 represents 16-FQAM combining 4-QAM and 4-FSK.

Figure 1C:
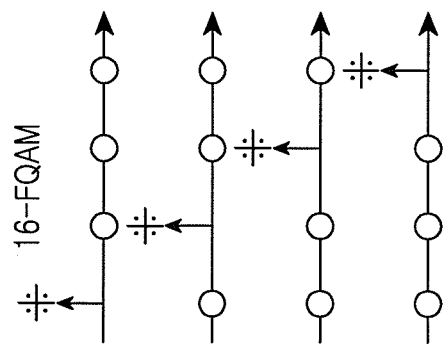
FIGS. 1A to 1C illustrate the concept of a Frequency-Quadrature Amplitude Modulation (FQAM) technique.
Figure 1B:
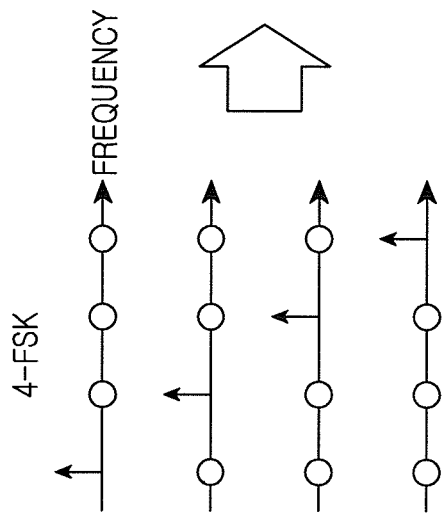
Figure 1A:
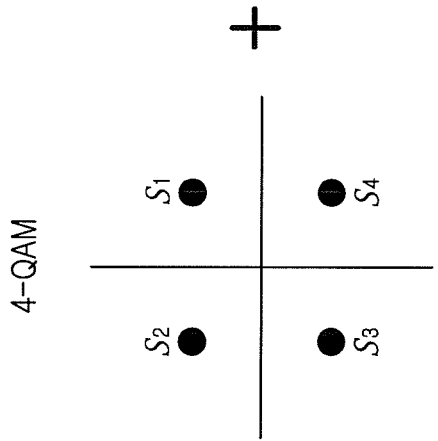

Referring to FIG. 1, the 4-QAM illustrated in FIG. 1(a) has four constellation points in a rectangular coordinate system, thereby being able to generate four complex symbols having different phases. The 4-FSK illustrated in FIG. 1(b) uses four frequency values, thereby being able to generate four complex symbols having different frequency values. The 16-FQAM illustrated in FIG. 1(c) is a combination of the 4-QAM and the 4-FSK. As in FIG. 1(c), because FQAM symbols can have different four frequency values and simultaneously can have different four phase values, a total of sixteen FQAM symbols can be generated.

As above, the FQAM extends by the number of frequencies the number of bit streams expressible by QAM only, using whether a QAM symbol is mapped to which frequency. In other words, the FQAM extends by the number of QAM symbols the number of bit streams expressible by FSK only, using a phase and size of an FSK symbol. That is, an FQAM symbol is identified by a combination of the phase and size of the FSK symbol and a position of a frequency resource to which the QAM symbol is mapped.

The present invention proposes a modulation method combining Time Shift Keying (TSK) instead of the FSK, to the QAM. Below, the present invention designates the modulation method combining the TSK and the QAM as 'Time-Quadrature Amplitude Modulation (TQAM)'. The concept of the TQAM technique is described in FIG. 2 below.

FIG. 2 illustrates the concept of a TQAM technique according to an exemplary embodiment of the present invention. FIG. 2 represents 16-TQAM combining 4-QAM and 4-TSK.

Figure 2C:
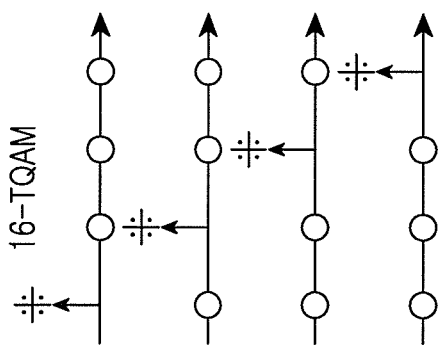
FIGS. 2A to 2C illustrate the concept of a Time-Quadrature Amplitude Modulation (TQAM) technique according to an embodiment of the present invention.
Figure 2B:
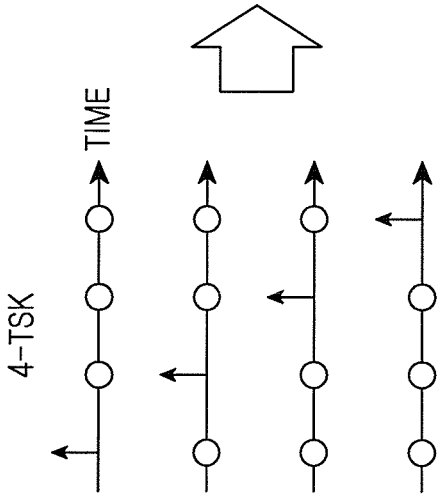
Figure 2A:
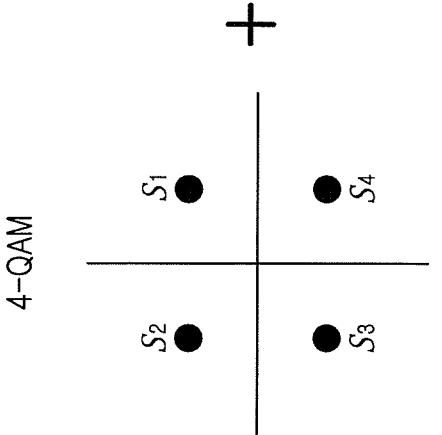

Referring to FIG. 2, the 4-QAM illustrated in FIG. 2(a) has four constellation points in a rectangular coordinate system, thereby being able to generate four complex symbols having different phases. The 4-TSK illustrated in FIG. 2(b) uses four transmission time points, thereby being able to generate four complex symbols having different transmission time points. The 16-TQAM illustrated in FIG. 2(c) is a combination of the 4-QAM and the 4-TSK. As in FIG. 2(c), because TQAM symbols can have different four transmission time points and simultaneously can have different four phase values, a total of sixteen TQAM symbols can be generated.

As above, the TQAM extends by the number of time resources the number of bit streams expressible by QAM only, using whether a QAM symbol is mapped to which time resource. In other words, the TQAM extends by the number of QAM symbols the number of bit streams expressible by TSK only, using a phase and size of a TSK symbol. That is, a TQAM symbol is identified by a combination of the phase and size of the TSK symbol and a position of a time resource to which the QAM symbol is mapped.

Compared to the FQAM, the TQAM has advantages as follows. In general, a channel variation speed of a time axis is slower than that of a frequency axis. Therefore, when symbols are disposed widely at the time axis as in the TQAM, a pilot overhead can be decreased. Also, compared to the FQAM, the TQAM requires a small quantity of frequency resources per one symbol. Therefore, it is easy that the TQAM is applied to a frequency-limited environment. Also, a system not using Orthogonal Frequency Division Multiplexing (OFDM) requires a plurality of matched filters according to a size of a used frequency. In this case, a TQAM receive end has a simple reception structure compared to an FQAM receive end, because TQAM symbol detection is required in the same frequency only.

Figure 3:
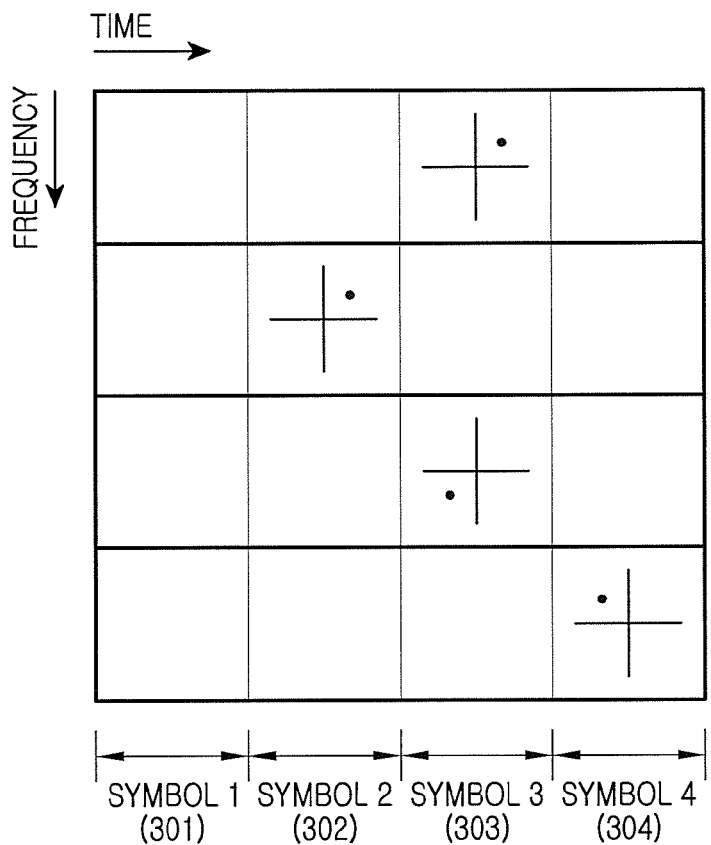
FIG. 3 illustrates a part of a frame of when applying TQAM in a wireless communication system according to an embodiment of the present invention.

On the contrary, the TQAM can have disadvantages as follows. A partial frame of when applying the TQAM is described as follows. FIG. 3 illustrates a part of a frame of when applying the TQAM to a wireless communication system according to an exemplary embodiment of the present invention. FIG. 3 represents a part of a frame of when applying the TQAM to an OFDM/Orthogonal Frequency Division Multiple Access (OFDMA) wireless communication system. FIG. 3 exemplifies 16-TQAM as in FIG. 2 above.

In FIG. 3, a horizontal axis denotes time, and a vertical axis denotes frequency. The time axis is divided in a unit of an OFDM symbol, and the frequency axis is divided in a unit of a subcarrier. And, a unit of one OFDM symbol and one subcarrier is called a tone. Referring to FIG. 3, one TQAM block includes four tones that occupy one subcarrier and four OFDM symbols. In FIG. 3, four OFDM symbols included in one TQAM block are illustrated adjacently. But, this is one example, and the four OFDM symbols included in one TQAM block may not be continuous physically.

In each TQAM block, a position of an OFDM symbol to which a QAM symbol is mapped is determined according to a value of transmission data. Resultantly, the distribution of QAM symbols at a time axis may not be uniform. In FIG. 3, an OFDM symbol 1 (301) includes no QAM symbol, an OFDM symbol 2 (302) includes one QAM symbol, an OFDM symbol 3 (303) includes two QAM symbols, and an OFDM symbol 4 (304) includes one QAM symbol.

As described above, in a case of the TQAM, there is a time-axis section (e.g., an OFDM symbol 1 (301) section) in which no power is transmitted. This causes a problem of decreasing average transmission power. Also, in a case of the TQAM, a Peak to Average Power Ratio (PAPR) can be high. Further, when a power per OFDM symbol is fixed, a power per TQAM symbol can be different.

As described above referring to FIG. 3, when the TQAM technique is applied, it can generate a time-axis section in which no signal is transmitted and a time-axis section in which power is concentrated. Due to this, a problem of PAPR increase and the like can occur. Accordingly, to uniformize the time-axis distribution of TQAM symbols, the present invention proposes an additional procedure as in FIG. 4A to FIG. 4C below.

Figure 4A:
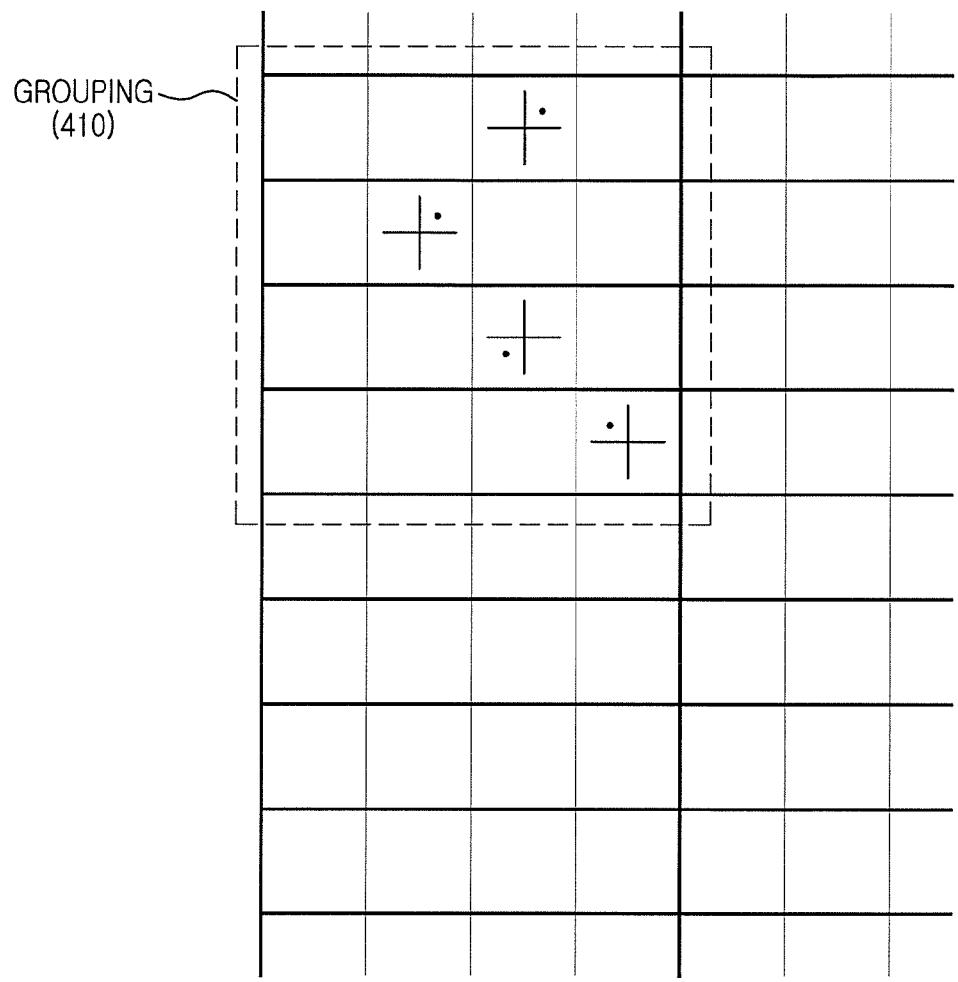
FIGS. 4A to 4C are diagrams illustrating a procedure of uniformizing TQAM symbols in a wireless communication system according to an exemplary embodiment of the present invention.
Figure 4B:
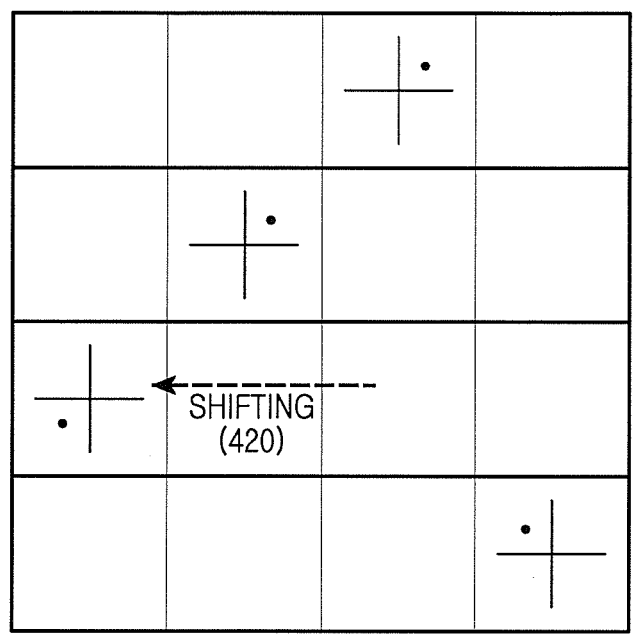
Figure 4C:
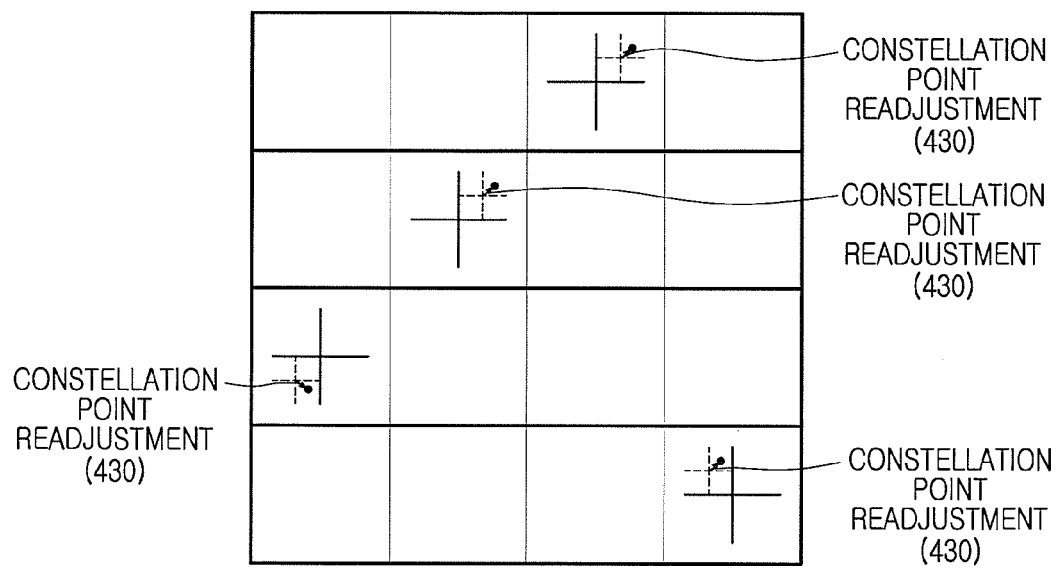

FIGS. 4A to 4C illustrate a procedure of uniformizing TQAM symbols in a wireless communication system according to an exemplary embodiment of the present invention. FIGS. 4A to 4C exemplify 16-TQAM as in FIG. 2.

FIG. 4A illustrates a plurality of TQAM blocks. Referring to FIG. 4A, a predetermined number of TQAM blocks are grouped (410) into one group. In FIG. 4A, four TQAM blocks are included in one group. Next, as in FIG. 4B, at least one QAM symbol is shifted (420) to the left at a time axis, such that the distribution of QAM symbols within one group is uniformized at the time axis. But, due to the shift 420, the at least one QAM symbol does not get out of a time-axis range of a TQAM symbol. In FIG. 4B, a QAM symbol mapped to the third subcarrier has been shifted to the left as much as two OFDM symbols at the time axis. Due to this, the distribution of TQAM symbols is uniformized at the time axis.

However, the position of the QAM symbol at the time axis is a factor of identifying an information bit. Therefore, if the position of the QAM symbol at the time axis is changed, information represented by the TQAM symbol is varied. Accordingly, to notify the shift performed by a transmit end to a receive end, information representing a shifted quantity, i.e., a shift value is added as in FIG. 4C.

As in FIG. 4C, the shift value is expressed through constellation point readjustment 430 applied onto a QAM symbol. Referring to FIG. 4C, QAM symbols mapped to the first, second, and fourth subcarriers have not been shifted. That is, shift values are equal to '0'. According to this, the QAM symbols mapped to the first, second, and fourth subcarriers are again mapped to constellation points indicating '0' within corresponding quadrants. And, the QAM symbol mapped to the third subcarrier shifted to the left as much as two OFDM symbols is mapped to a constellation point indicating '2' within a corresponding quadrant. That is, at least one bit for indicating the shift value is added to each QAM symbol. In FIG. 4C, two bits are added to each QAM symbol because a shift possible range is equal to '0' to '4'. The number of added bits can be varied according to a maximum value of the shift value. Resultantly, the QAM symbol mapped to the first subcarrier changes from '00' to '0000', the QAM symbol mapped to the second subcarrier changes from '00' to '0000', the QAM symbol mapped to the third subcarrier changes from '11' to '1011', and the QAM symbol mapped to the fourth subcarrier changes from '10' to '0010'. For description convenience below, the present invention designates a 'bit stream represented by a TQAM symbol before shift' as an 'original bit stream', and designates a 'bit stream represented by the TQAM symbol after the shift' as an 'extended bit stream'.

As described above, to uniformize the time-axis distribution of QAM symbols constructing a TQAM symbol, the present invention performs shift and bit addition. Resultantly, the modulation order of the QAM symbol is increased. But, generally, the QAM symbol has a higher detection probability compared to the FSK or TSK, so it is obvious that the entire decoding performance is not greatly deteriorated.

As the transmit end performs the procedure of FIG. 4A to FIG. 4C, the receive end performs reverse-processing for processing a probability value or decoding metric of the extended bit stream into a probability value or decoding metric of the original bit stream. That is, probability values or decoding metrics generated from a TQAM symbol received by the receive end represent the extended bit stream. The extended bit stream includes at least one bit indicating the shift value. The shift value, which is information not included in the original bit stream, indicates a shift extent for uniformizing QAM symbols at a time axis. Accordingly, because the original bit stream corresponding to information that the transmit end intends to transmit does not include the shift value, the receive end has to remove a shift value component.

For this, the receive end can remove a decoding metric of a partial bit corresponding to the shift value, from the decoding metric generated from the TQAM symbol. For example, in a case where a TQAM symbol mapped to the third subcarrier of FIG. 4C is received, the receive end generates a decoding metric '101100' from the received TQAM symbol. Here, Most Significant Bits (MSBs) '10' are a shift value, and Least Significant Bits (LSBs) '00' are a value corresponding to a position on a time axis, and middle bits '11' are a value corresponding to a QAM symbol. According to this, the receive end removes a decoding metric corresponding to the shift value '10' from the extended bit stream '101100' generated from the TQAM symbol.

For the receive end to remove a decoding metric of bits indicating the shift value, the decoding metric should be generated for each bit. For example, when the decoding metric is an LLR, the LLR should be generated per bit. In a case of performing binary decoding, the generating of the per-bit LLR is a part of a decoding process. Unlike this, in a case of performing non-binary decoding, the receive end should additionally generate the per-bit LLRs, remove a partial per-bit LLR, and then again convert the remnant per-bit LLRs into per-symbol LLRs. That is, because the non-binary decoding does not use the per-bit LLR, a procedure of generating the per-bit LLRs and converting the remnant per-bit LLRs into the per-symbol LLRs is added. Accordingly, according to another exemplary embodiment of the present invention, instead of removing the decoding metric of at least one bit indicating the shift value, if combining probability values of symbol candidates, the receive end can obtain the same effect.

That is, instead of removing a decoding metric of a partial bit after generating the decoding metric, at a time when determining probability values of QAM symbol candidates, the receive end can exclude at least one bit indicating the shift value. For example, in a case where two MSBs indicate the shift value among a total of six bits, a symbol probability value for the original bit stream '0000' can be determined by summing up a probability value for an extended bit stream '000000', a probability value for an extended bit stream '010000', a probability value for an extended bit stream '100000', and a probability value for an extended bit stream '110000'.

Also, because the transmit end shifts a QAM symbol to uniformize QAM symbols at a time axis, a value of at least one bit indicating a position of the QAM symbol is different from that of the original bit stream. Accordingly, after detecting a shift value, the receive end has to reverse-shift the QAM symbol according to the detected shift value. In other words, the receive end adjusts a time-axis index of the QAM symbol on the basis of the shift value. The receive end adjusts a time-axis index of probability values or decoding metrics of per-time-resource reception signal values and per-time-resource transmission symbol candidates, on the basis of the shift value. For example, when a TQAM symbol mapped to the third subcarrier of FIG. 4C is received, even if the receive end has actually received a QAM symbol through the third tone, the receive end processes a signal value received through the third tone into a signal value received through the first tone, according to the detected shift value. The time-axis index adjustment can be performed after probability value determination or decoding metric generation.

To detect the shift value, the receive end determines transmission probability values of candidate symbols having considered only at least one bit indicating the shift value, and detects the shift values on the basis of the symbol probability values. For example, the receive end can determine that a candidate symbol having the highest probability value has been transmitted, through hard decision. For another example, after generating a decoding metric through the hard decision, i.e., using the probability values, the receive end can perform decoding using the decoding metric.

Here, the symbol probability values having considered only the shift value can be determined by summing up probability values of symbol candidates having the same bit indicating the shift value among probability values of the respective entire symbols. For example, in a case where two MSBs indicate the shift value among a total of six bits, a symbol probability value for the shift value '00' can be determined by summing up probability values of sixteen extended bit streams (e.g., 000000 to 001111) whose MSBs are equal to '00'.

The order of the aforementioned TQAM method can be expressed by a combination of QAM order and TSK order. If the order of the TQAM is given, the ratio of the QAM order to the TSK order can be determined according to a channel quality. For example, if a channel is bad relatively, it is desirable to increase the TSK order. On the contrary, if the channel is good relatively, it is desirable to increase the QAM order. Accordingly, a base station and a terminal supporting the TQAM method can determine the QAM order and the TSK order according to the channel quality. For this, one of the base station and the terminal can store a table defining a combination of QAM order and TSK order corresponding to a channel quality.

Since the aforementioned TQAM method is a newly-proposed modulation technology, a decoding metric generating method has not ever been proposed. Unlike the QAM, in a case of the TQAM, because one TQAM symbol occupies a plurality of tones on a time axis, it is not suitable to extend an LLR calculation method proposed for the QAM to the TQAM as it is. That is, if an LLR generating method for the existing QAM is applied for decoding of a generated TQAM symbol, it can bring about great performance deterioration. Accordingly, the presentation of an effective LLR generating method for the TQAM is needed.

Most channel decoders receive an LLR as an input and estimate an information bit or symbol. In general, a binary decoder determines an LLR as in Equation 1 below.

$$L_{k,\lambda}^{BICM}(\hat{H}[k], y[k]) = \ln \frac{\sum_{w \in A_0^\lambda} f_{Y[k]}(y[k] | \hat{H}[k], s[k] = w)}{\sum_{w \in A_1^\lambda} f_{Y[k]}(y[k] | \hat{H}[k], s[k] = w)} \quad (1)$$

In Equation 1 above, the $L_{k,\lambda}^{BICM}$ denotes an LLR of a $\lambda^{th}$ bit of a $k^{th}$ symbol corresponding to binary decoding, the $\hat{H}[k]$ denotes estimation of a channel coefficient for a $k^{th}$ transmission symbol, the $y[k]$ denotes a reception signal corresponding to the $k^{th}$ transmission symbol, the $A_0^\lambda$ denotes a set of candidate symbols whose $\lambda^{th}$ bits are equal to '0', the $A_1^\lambda$ denotes a set of candidate symbols whose $\lambda^{th}$ bits are equal to '1', the $f_y[k]$ denotes a pdf of a $k^{th}$ reception symbol, and the $s[k]$ denotes the $k^{th}$ transmission symbol. The w is a dummy variable representing a transmissible symbol candidate. In a case of 16-QAM, the $A_0^\lambda$ includes eight symbols among the entire sixteen symbols, and the $A_1^\lambda$ includes the remnant eight symbols.

On the contrary, a non-binary decoder determines an LLR as in Equation 2 below and then, uses the determination result as an input.

$$L_k^{CM}(y[k],\hat{H}[k])=(L_0 L_1 \ldots L_{M-1}) \text{ where } L_l=\ln(f_{Y[k]}(y[k]|\hat{H}[k],s[k]=x_l)) \quad (2)$$

In Equation 2 above, the $L_k^{CM}$ denotes a symbol LLR for a $k^{th}$ symbol, the y[k] denotes a reception signal corresponding to a $k^{th}$ transmission symbol, the $\hat{H}[k]$ denotes estimation of a channel coefficient for the $k^{th}$ transmission symbol, the $L_l$ denotes an LLR corresponding to an $l^{th}$ candidate symbol, the $f_{y[k]}(\ )$ denotes a pdf of a $k^{th}$ reception symbol, the s[k] denotes the $k^{th}$ transmission symbol, and the $x_l$ denotes the $l^{th}$ candidate symbol.

As appreciated from Equation 1 above and Equation 2 above, the determination of the pdf is needed to determine the LLR necessary for channel decoding.

A Complex Generalized Gaussian (CGG) decoding method is a representative method among existing non-Gaussian decoding methods. On the assumption that an interference signal or noise follows a CGG distribution, the CGG decoding method determines an LLR or pdf and provides the determination result as an input of a channel decoder. The CGG decoding method includes a Gaussian decoding method, so the present invention describes only the CGG decoding method. A pdf of the CGG distribution is given as in Equation 3 below.

$$f_{\hat{Z}}(z|\alpha,\beta) = \frac{\alpha}{2\pi\beta^2 \Gamma\left(\frac{2}{\alpha}\right)} \exp\left(-\left(\frac{|z|}{\beta}\right)^\alpha\right) \quad (3)$$

In Equation 3 above, the $f_{\hat{Z}}$ is a pdf of a noise, the z is a variable indicating the noise, the $\alpha$ is a shape parameter and is a variable expressing the extent of non-Gaussian, the $\beta$ is a scale parameter and is a variable expressing a variance, and the $\Gamma$ is a Gamma function and is defined as $\Gamma(z) \triangleq \int_0^\infty t^{z-1} \exp(-t) dt$.

In Equation 3 above, the pdf of the CGG distribution follows a Gaussian distribution if the $\alpha$ is equal to '2', and follows a super Gaussian distribution having a heavy-tail if the $\alpha$ is less than '2', and follows a sub Gaussian distribution having a light-tail if the $\alpha$ is more than '2'. That is, the CGG decoding method is the same as the Gaussian decoding method if the $\alpha$ is equal to '2'.

Most interference signals and noises are modeled into super Gaussian or Gaussian in which the $\alpha$ is equal to '0' to '2'. The $\beta$ called the scale parameter performs the same role as a dispersion of a Gaussian pdf. pdfs used for most non-Gaussian decoding methods include the shape parameter $\alpha$ and scale parameter $\beta$ of the CGG distribution. Accordingly, the present invention describes CGG for example, but it is obvious that the present invention is identically applicable even to the existing most non-Gaussian decoding methods.

To CGG-decode a QAM, determination of a pdf is needed as in Equation 4 below.

$$f_{Y[k]}(y[k]|\hat{H}[k],s[k]) = \frac{\alpha}{2\pi\beta^2 \Gamma(2/\alpha)} \exp\left(-\left(\frac{|y[k]-\hat{H}[k]s[k]|}{\beta}\right)^\alpha\right) \quad (4)$$

In Equation 4 above, the $f_{Y[k]}(\ )$ is a pdf of a $k^{th}$ transmission symbol, the y[k] is a reception signal corresponding to the $k^{th}$ transmission symbol, the $\hat{H}[k]$ is estimation of a channel coefficient for the $k^{th}$ transmission symbol, the s[k] is the $k^{th}$ transmission symbol, the $\alpha$ is a shape parameter, the $\beta$ is a scale parameter, and the $\Gamma$ is a Gamma function and is defined as $\Gamma(z) \triangleq \int_0^\infty t^{z-1} \exp(-t) dt$.

Various methods of estimating an $\alpha$ value and a $\beta$ value exist. Below, the present invention describes a moment matching technique that is an already proposed method, for example. According to the moment matching technique, the $\alpha$ value and the $\beta$ value are estimated by matching a primary moment and a secondary moment. The estimation of the $\alpha$ value and $\beta$ value is given by a numerical expression as in Equation 5 below.

$$\alpha = \frac{\ln(3^6/2^{10})}{\ln\left((E[|\hat{J}[k]|])^2/E[|\hat{J}[k]|^2]\right) - \frac{\pi}{4} + \frac{9}{2^{3.5}}} + \ln\left(\frac{3}{2\sqrt{2}}\right) \quad (5)$$

$$\hat{J}[k] = y[k] - \hat{H}[k]\hat{s}[k]$$

$$\beta = \frac{\Gamma(2/\alpha\alpha)}{\Gamma(3/\alpha\alpha)} E[|\hat{J}[k]|]$$

In Equation 5 above, the $\alpha$ is a shape parameter, the $\beta$ is a scale parameter, the y[k] is a reception signal corresponding to a $k^{th}$ transmission symbol, the $\hat{H}[k]$ is estimation of a channel coefficient for the $k^{th}$ transmission symbol, the $\hat{s}[k]$ is the $k^{th}$ transmission symbol estimated in a hard decision method, and the $\Gamma$ is a Gamma function and is defined as $\Gamma(z) \triangleq \int_0^\infty t^{z-1} \exp(-t) dt$.

Unlike the QAM, in a case of the TQAM, because one TQAM symbol occupies a plurality of tones, it is not suitable to extend an LLR calculation method proposed for the QAM to the TQAM. Accordingly, the present invention can determine a pdf of a Gaussian or non-Gaussian symbol for the TQAM as in Equation 6 below and Equation 7 below.

$$f_{Y[k]}(y[k]|\hat{H}[k]\cdot q[k]\cdot s[k]) = \prod_{l=0}^{M_F-1} f_{Y_l[k]}(y_l[k]|\hat{H}_l[k]\cdot q[k]\cdot s[k]) \quad (6)$$

In Equation 6 above, the $f_{Y[k]}(\ )$ denotes a pdf of a $k^{th}$ transmission symbol, the y[k] denotes a reception signal corresponding to the $k^{th}$ transmission symbol, the $\hat{H}[k]$ denotes estimation of a channel coefficient for the $k^{th}$ transmission symbol, the q[k] denotes an index of a time resource on which a QAM symbol is placed in a $k^{th}$ TQAM block, the s[k] denotes the $k^{th}$ transmission symbol, the $M_F$ denotes the number of tones included in a TQAM block, the $f_{Y_l[k]}(\ )$ denotes a pdf of the $k^{th}$ transmission symbol at an $l^{th}$ tone, the $y_l[k]$ denotes a reception signal corresponding to the $k^{th}$ transmission symbol at the $l^{th}$ tone, the $\hat{H}_l[k]$ denotes estimation of a channel coefficient for the $k^{th}$ transmission symbol at the $l^{th}$ tone.

$$f_{Y_l[k]}(y_l[k]|\hat{H}_l[k],q[k],s[k]) = \frac{\alpha}{2\pi\beta^2 \Gamma(2/\alpha)} \exp\left(-\left(\frac{|y[k]-\hat{H}_l[k]s[k]\delta_{l,q[k]}|}{\beta}\right)^\alpha\right) \quad (7)$$

In Equation 7 above, the $f_{Y_l[k]}(\ )$ denotes a pdf of a $k^{th}$ transmission symbol at an $l^{th}$ tone, the $y_l[k]$ denotes a reception signal corresponding to the $k^{th}$ transmission symbol at the $l^{th}$ tone, the $\hat{H}_l[k]$ denotes the estimation of a channel coefficient for the $k^{th}$ transmission symbol at the $l^{th}$ tone, the q[k]

denotes an index of a time resource on which a QAM symbol is placed in a $k^{th}$ TQAM block, the s[k] denotes the $k^{th}$ transmission symbol, the α is a shape parameter, the β denotes a scale parameter, the Γ denotes a Gamma function, and the $\delta_{l,q[k]}$ denotes a delta function. The Gamma function is defined as $\Gamma(z) \triangleq \int_0^\infty t^{z-1} \exp(-t) dt$, and the delta function provides '1' if the l and the q[k] are equal to each other, and provides '0' as a result otherwise.

A difference between a TQAM pdf and a QAM pdf is given as follows. In a case of TQAM, because one TQAM symbol occupies a plurality of tones, a symbol pdf should be expressed by a pdf of each tone. The present invention expresses the symbol pdf by a multiplication of pdfs of respective tones, on the premise that QAM symbols between respective tones or interference signals are independent and identically distributed (i.i.d.) among themselves. To implement a method proposed in the present invention, a means for generating a symbol pdf by multiplying per-tone pdfs is required. According to the method proposed in the present invention, decoding performance approximating to theoretical limit performance can be obtained.

The conventional most non-Gaussian decoding methods include determination of a multiplier of the shape parameter α. Because the α value is an integer value larger than '0', a complexity for determining the 'α' multiplier is so large generally. Accordingly, the present invention more proposes a method for decreasing a complexity of multiplier determination of the non-Gaussian decoding method.

According to an exemplary embodiment of the present invention, the receive end can set the shape parameter α to a fixed value. Because most actual interference signals or noises follow a super Gaussian distribution having a heavy-tail, the shape parameter α of a non-Gaussian distribution (e.g., CGG, Generalized Gaussian (GG), and Symmetric alpha Stable (SaS)) generally has a value of '0' to '2'. Therefore, the present invention proposes a method of fixing the shape parameter α to '1' as in Equation 8 below. Although the shape parameter α is fixed to '1', performance approximating to theoretical limit performance in an actual cellular environment can be obtained.

$$f_{Y_l[k]}(y_l[k] \mid \hat{H}_l[k], q[k], s[k]) = \frac{1}{2\pi\beta^2} \exp\left(-\frac{|y[k] - \hat{H}_l[k]s[k]\delta_{l,q[k]}|}{\beta}\right) \quad (8)$$

In Equation 8 above, the $f_{Y_l[k]}(\ )$ denotes a pdf of a $k^{th}$ transmission symbol at an $l^{th}$ tone, the $y_l[k]$ denotes a reception signal corresponding to the $k^{th}$ transmission symbol at the $l^{th}$ tone, the $\hat{H}_l[k]$ denotes estimation of a channel coefficient for the $k^{th}$ transmission symbol at the $l^{th}$ tone, the q[k] denotes an index of a time resource on which a QAM symbol is placed in a $k^{th}$ TQAM block, the s[k] denotes the $k^{th}$ transmission symbol, the β denotes a scale parameter, the Γ denotes a Gamma function, and the $\delta_{l,q[k]}$ denotes a delta function. The Gamma function is defined as $\Gamma(z) \triangleq \int_0^\infty t^{z-1} \exp(-t) dt$, and the delta function provides '1' if the l and the q[k] are equal to each other and provides '0' as a result otherwise.

According to another exemplary embodiment of the present invention, instead of fixing the shape parameter α to one value, the receive end can choose one of a plurality of candidates. The method of fixing the shape parameter to '1' as in Equation 8 above brings about a small quantity of performance deterioration in a channel in which a non-Gaussian characteristic is not robust. As a countermeasure for avoiding the performance deterioration, the present invention can estimate the shape parameter α, compare an estimated α value with a predefined plurality of α value candidates, and use a substituted candidate value most approximating to the estimated α value.

According to a further exemplary embodiment of the present invention, the receive end can use a polynomial expression having the small number of operations, for the entire section or partial section of a pdf. For example, Taylor approximation can be used in place of exponential functions of Equation 7 above and Equation 8 above. In detail, if Exp(x) is Taylor-expanded, it is expressed by an infinite series like '$1+x+(x^2)/2+(x^3)/6+\ldots$'. At this time, polynomial fitting can be achieved by taking only a predetermined number of terms giving a great influence among an infinite number of series. For example, in a case of taking only three terms, the Exp(x) can approximate to '$1+x+(x^2)/2$'. That is, the polynomial expression for decreasing the number of operations can include a predefined number of terms among the Talyor series of the exponential function.

Below, the present invention describes the aforementioned TQAM pdf generating process and a concrete example thereof. For description convenience, the present invention describes 4-TQAM combining 2-QAM and 2-TSK, for example. In this case, one bit is required for indicating a shift of a QAM symbol. In the following description, 'calculating a probability value' and 'calculating a pdf' are used as the same meaning. This is because the pdf is a numerical expression of a probability and the probability value is determined just if determining the pdf and substituting an input variable.

FIG. 5 illustrates an example of a 4-TQAM constellation point in a wireless communication system according to an exemplary embodiment of the present invention. FIG. 5 illustrates a total of eight constellation points. In a case of 4-TQAM, four constellation points can be generated, but eight constellation points are required because one bit for indicating a shift value should be added. That is, in FIG. 5, the first bit expresses information represented by a TSK symbol, the second bit expresses information represented by a QAM symbol, and the third bit expresses a shift value.

Figure 5A:
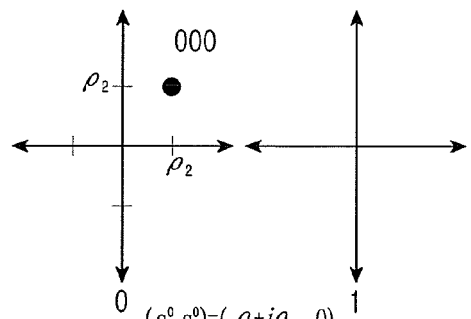
FIGS. 5A to 5H are a diagram illustrating an example of a 4-TQAM constellation point in a wireless communication system according to an exemplary embodiment of the present invention.
Figure 5B:
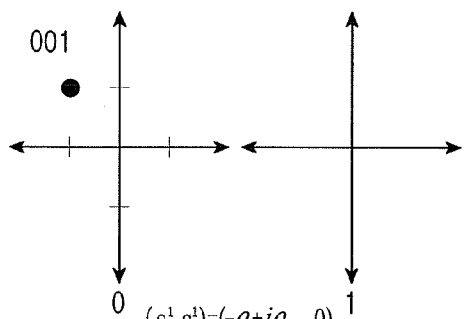
Figure 5C:
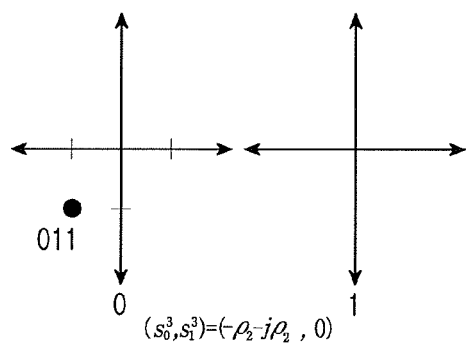
Figure 5D:
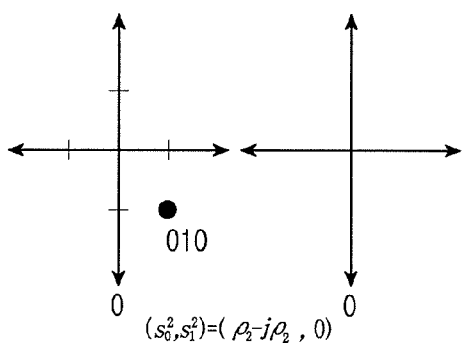
Figure 5E:
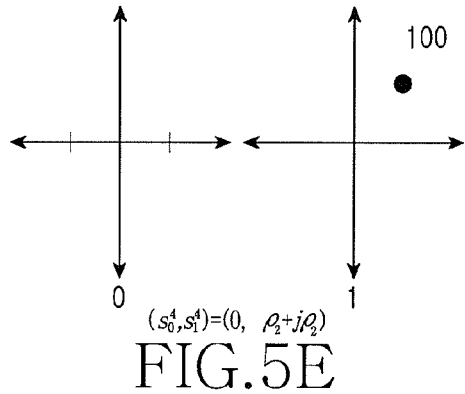
Figure 5F:
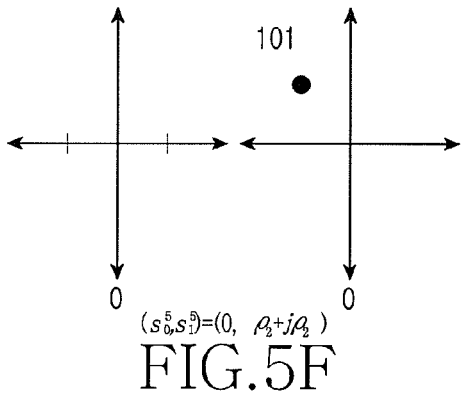
Figure 5G:
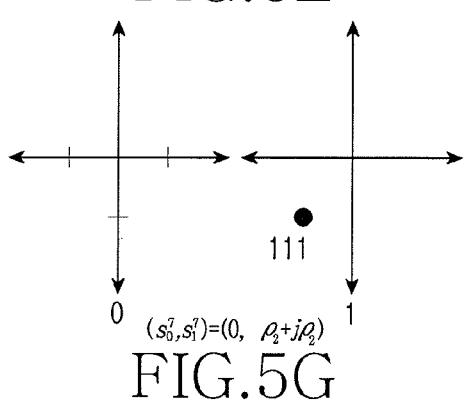
Figure 5H:
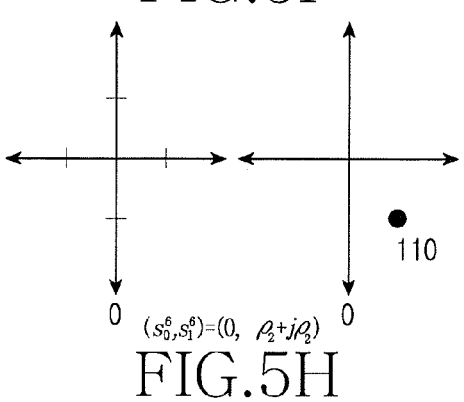

In each of FIG. 5(a) to FIG. 5(h), two rectangular coordinate systems represent two tones mapped to different time resources. A QAM symbol can have $\rho_2$ at a real-number axis and can have a value of $\rho_2$ at an imaginary-number axis. Here, the $\rho_2$ is set to a value of a square root $$\left(\sqrt{\frac{E_s}{2}}\right)$$

or less of the half of energy of the symbol. In FIG. 5(a), a TQAM symbol is mapped to the first subcarrier, and has a value of $\rho_2+j\rho_2$. Each constellation point illustrated in FIG. 5 is given by a numerical expression as in Equation 9 below.

$$(s_0^0, s_1^0) = (\rho_2+j\rho_2, 0)$$

$$(s_0^1, s_1^1) = (-\rho_2+j\rho_2, 0)$$

$$(s_0^2, s_1^2) = (\rho_2-j\rho_2, 0)$$

$$(s_0^3, s_1^3) = (-\rho_2+j\rho_2, 0)$$

$$(s_0^4, s_1^4) = (0, \rho_2+j\rho_2)$$

$$(s_0^5, s_1^5) = (0, \rho_2+j\rho_2)$$

$$(s_0^6, s_1^6) = (0, \rho_2+j\rho_2)$$

$$(s_0^7, s_1^7) = (0, \rho_2+j\rho_2) \quad (9)$$

In Equation 9 above, the $s_a^b$ denotes a symbol value mapped to a time resource a when a bit stream represented by a TQAM symbol is equal to b, and the $\rho_2$ denotes an absolute value of a real-number axis and imaginary-number axis of a QAM symbol.

Assuming that the remnant signals excepting a transmission signal among reception signals is an additive noise, pdfs having to be determined to generate a decoding metric are given as in Equation 10 below.

$$f_n^0([y_0,y_1]-[s_0^0,s_1^0])=f_n(y_0-s_0^0)f_n(y_1-s_1^0)=f_n(y_0-s_0^0)f_n(y_1)$$

$$f_n^1([y_0,y_1]-[s_0^1,s_1^1])=f_n(y_0-s_0^1)f_n(y_1-s_1^1)=f_n(y_0-s_0^1)f_n(y_1)$$

$$f_n^2([y_0,y_1]-[s_0^2,s_1^2])=f_n(y_0-s_0^2)f_n(y_1)$$

$$f_n^3([y_0,y_1]-[s_0^3,s_1^3])=f_n(y_0-s_0^3)f_n(y_1)$$

$$f_n^4([y_0,y_1]-[s_0^4,s_1^4])=f_n(y_0)f_n(y_1-s_1^4)$$

$$f_n^5([y_0,y_1]-[s_0^5,s_1^5])=f_n(y_0)f_n(y_1-s_1^5)$$

$$f_n^6([y_0,y_1]-[s_0^6,s_1^6])=f_n(y_0)f_n(y_1-s_1^6)$$

$$f_n^7([y_0,y_1]-[s_0^7,s_1^7])=f_n(y_0)f_n(y_1-s_1^7) \qquad (10)$$

In Equation 10 above, the $f_n^b(\ )$ denotes a probability function in which a bit stream represented by a transmitted TQAM symbol is equal to b, the $f(\ )$ denotes a pdf of a noise, the $y_a$ denotes a signal received through a time resource a, and the $s_a^b$ denotes a symbol value mapped to the time resource a when the bit stream represented by the transmitted TQAM symbol is equal to b.

As in Equation 10 above, probability values of respective transmissible symbols are determined by multiplying probabilities of respective time resources. For example, in FIG. 5(a), a probability value of a TQAM symbol '000' is determined by multiplying a probability that '$\rho_2+j\rho_2$' would be transmitted at the first time resource and a probability that '0' would be transmitted at the second time resource. Here, the probability that the '$\rho_2+j\rho_2$' would be transmitted at the first time resource is a probability that the same noise as a value subtracting the '$\rho_2+j\rho_2$' from a reception signal value of the first time resource is generated, and can be determined by the pdf of the noise. Also, the probability that the '0' would be transmitted at the second time resource is a probability in which the same noise as a reception signal value of the second time resource is generated, and can be determined by the pdf of the noise. For example, the pdf of the noise can be given as in Equation 7 above or Equation 8 above.

Figure 6:
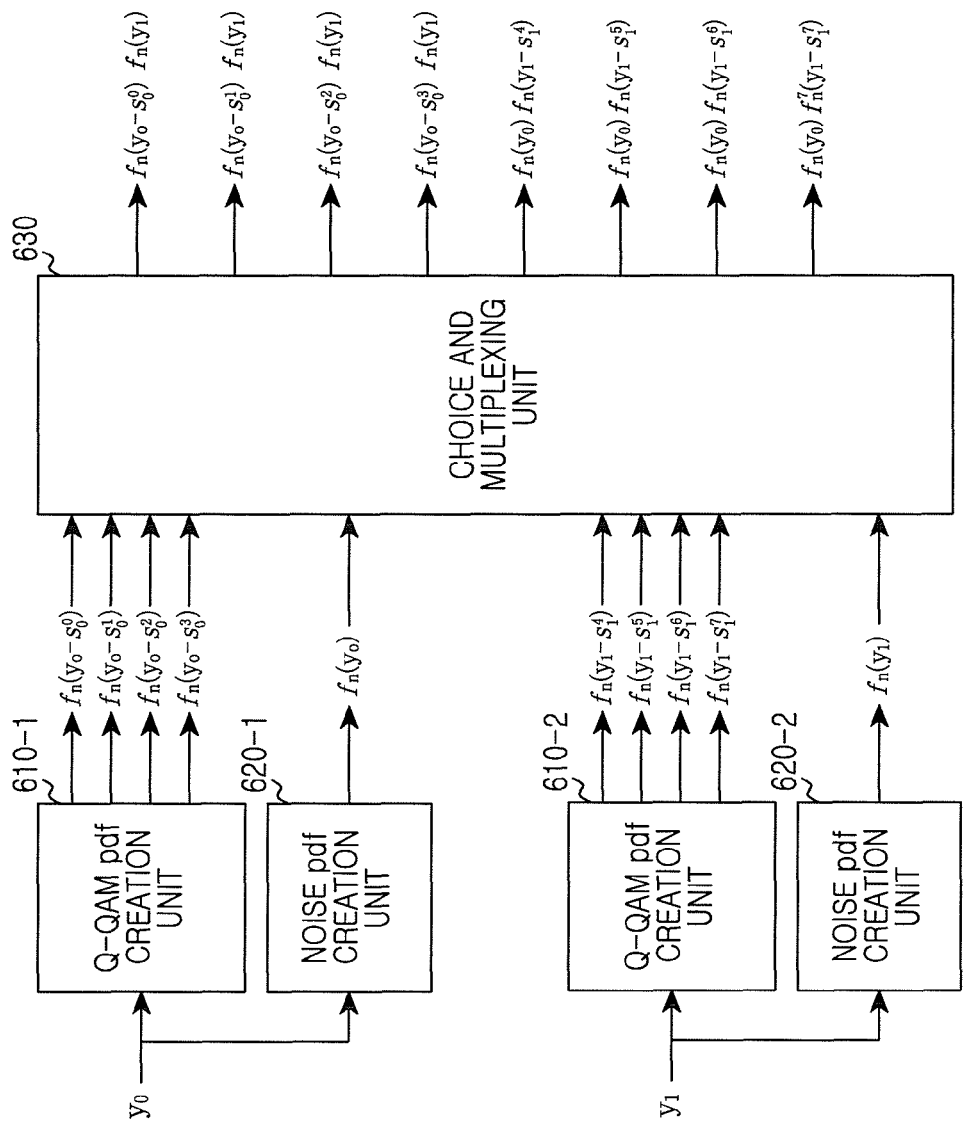
FIG. 6 is a block diagram illustrating a construction of a TQAM probability density function (pdf) generating means in a wireless communication system according to an exemplary embodiment of the present invention.

FIG. 6 illustrates a construction of a TQAM pdf generating means in a wireless communication system according to an exemplary embodiment of the present invention. FIG. 6 conceptually represents a process of generating a probability of each transmissible TQAM symbol from a reception value of the TQAM symbol.

Referring to FIG. 6, a reception signal value ($y_0$) of the first time resource is input to a 1st Q-QAM pdf generating unit 610-1 and a 1st noise pdf generating unit 620-1. A reception signal value ($y_1$) of the second time resource is input to a 2nd Q-QAM pdf generating unit 610-2 and a 2nd noise pdf generating unit 620-2. According to this, the 1st Q-QAM pdf generating unit 610-1 outputs probability values of respective four cases where a TQAM symbol is located in the first time resource. The 2nd Q-QAM pdf generating unit 610-2 outputs probability values of respective four cases in which a TQAM symbol is located in the second time resource. The 1st noise pdf generating unit 620-1 and the 2nd noise pdf generating unit 620-2 output a probability value in which the given reception signal value is a noise. Next, a choice and multiplexing unit 630 multiplies each of the probability values generated in the 1st Q-QAM pdf generating unit 610-1 by the probability value generated in the 2nd noise pdf generating unit 620-2, and multiplies each of the probability values generated in the 2nd Q-QAM pdf generating unit 610-2 by the probability value generated in the 1st noise pdf generating unit 620-1. According to this, the probability values of the respective transmissible symbols are determined as in Equation 10 above.

A decoding metric is generated from the above-determined probability values of the respective transmissible symbols. If the decoding metric is an LLR, the decoding metric can be determined as the ratio of other probability values to one probability value.

If a channel situation is poor, FQAM has to allocate so many resources to a frequency axis. In this case, a big problem can occur in frequency resource securing and pilot overhead. However, in a case of using TQAM also, resources have to be allocated long to a time axis, so a latency problem can occur. To take all of advantages of the FQAM and the TQAM, a modulation method combining the FQAM and the TQAM can be used as well. Below, the present invention designates the modulation method combining the FQAM and the TQAM as a 'TF-mixed-QAM' technique.

In a case of the TF-mixed-QAM technique, a pdf of a transmission symbol can be expressed as a combination of a pdf for a TQAM technique and a pdf for an FQAM technique. A pdf of a TF-mixed-QAM symbol is given as in Equation 11 below.

$$f_{\vec{Y}[k]}\left(\vec{y}[k] \mid \vec{H}[k], m[k], q[k], s[k]\right) = \prod_{l=0}^{M_F-1} \prod_{t=0}^{M_T-1} f_{Y[k]}(y_{l,t}[k] \mid H_{l,t}[k], m[k], q[k], s[k]) \qquad (11)$$

In Equation 11 above, the $f_{\vec{Y}[k]}(\ )$ denotes a pdf of a $k^{th}$ transmission symbol, the $\vec{y}[k]$ denotes a reception signal corresponding to the $k^{th}$ transmission symbol, the $\vec{H}[k]$ denotes a channel coefficient for the $k^{th}$ transmission symbol, the m[k] denotes an index of a frequency resource on which a QAM symbol is placed in a $k^{th}$ TF-mixed-QAM block, the q[k] denotes an index of a time resource on which the QAM symbol is placed in the $k^{th}$ TF-mixed-QAM block, the s[k] denotes the $k^{th}$ transmission symbol, the $M_F$ denotes the number of tones of a frequency axis included in the TF-mixed-QAM block, the $M_T$ denotes the number of tones of a time axis included in the TF-mixed-QAM block, the $f_{Y[k]}(\ )$ denotes a pdf of the $k^{th}$ transmission symbol at one tone, the $y_{l,t}[k]$ denotes a reception signal corresponding to the $k^{th}$ transmission symbol at an $l^{th}$ frequency tone and a $t^{th}$ time tone, the $\hat{H}_{l,t}[k]$ denotes estimation of a channel coefficient for the $k^{th}$ transmission symbol at the $l^{th}$ frequency tone and the $t^{th}$ time tone.

Below, the present invention describes an operation and construction of a transmit end and receive end supporting TQAM in detail with reference to the drawings.

Figure 7:
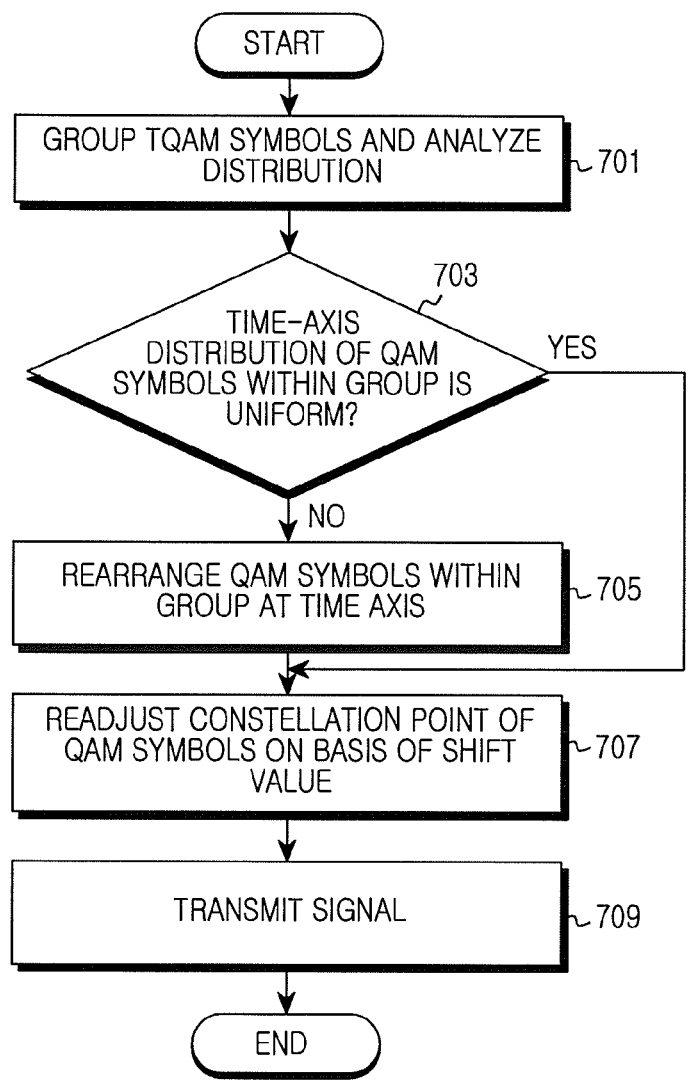
FIG. 7 is a flowchart illustrating an operation procedure of a transmit end according to an exemplary embodiment of the present invention.

FIG. 7 illustrates an operation procedure of a transmit end according to an exemplary embodiment of the present invention.

Referring to FIG. 7, in step 701, the transmit end groups TQAM symbols, and analyzes a time-axis distribution of QAM symbols within a group. The grouping is carried out such that a predefined number of TQAM symbols are included within a group. Through this, the transmit end can determine whether the QAM symbols have been concentrated on a specific time resource within the group, in other words, whether the QAM symbols have been non-uniformly distributed at a time axis.

Next, the transmit end proceeds to step 703 and determines if the time-axis distribution of the QAM symbols within the group is uniform. If the time-axis distribution of the QAM symbols within the group is uniform, the transmit end omits subsequent step 705 and jumps to subsequent step 707.

On the contrary, if the time-axis distribution of the QAM symbols within the group is not uniform, the transmit end proceeds to step 705 and rearranges the QAM symbols within the group at the time axis. That is, by rearranging the QAM symbols within the group, the transmit end uniformizes the time-axis distribution of the QAM symbols within the group. For the sake of this, the transmit end can shift at least one QAM symbol within a TQAM symbol range at the time axis. For instance, the transmit end can shift a partial QAM symbol at the time axis as in FIG. 4B.

Next, the transmit end proceeds to step 707 and readjusts a constellation point of each QAM symbol on the basis of the shift value of the each QAM symbol. In other words, to add a bit indicating the shift value, the transmit end performs constellation point readjustment. At this time, the transmit end changes even a constellation point of a non-shifted QAM symbol so as to indicate that a shift value of the non-shifted QAM symbol is equal to '0'.

After that, the transmit end proceeds to step 709 and transmits a signal. That is, the transmit end performs a signal processing procedure for transmitting the TQAM symbol, and transmits the signal through at least one antenna. For instance, the transmit end can perform Inverse Fast Fourier Transform (IFFT), Radio Frequency (RF) conversion and the like.

In FIG. 7, step 703 to step 707 are repeatedly performed for each group of TQAM symbols.

Figure 8:
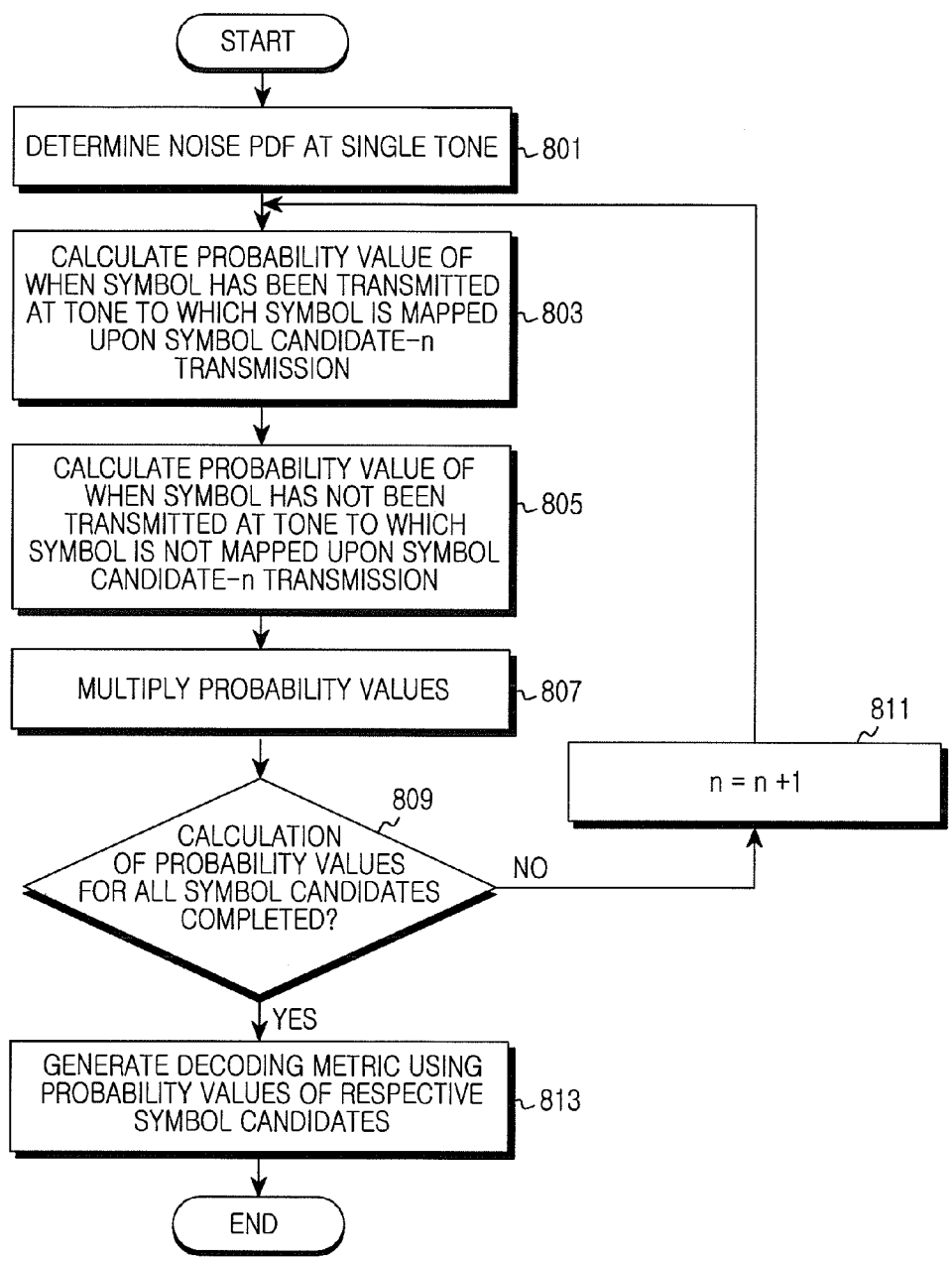
FIG. 8 is a flowchart illustrating a decoding metric generating procedure of a receive end in a wireless communication system according to an exemplary embodiment of the present invention.

FIG. 8 illustrates a decoding metric generating procedure of a receive end in a wireless communication system according to an exemplary embodiment of the present invention. At the start of the procedure illustrated in FIG. 8, 'n' is initialized to '0'.

Referring to FIG. 8, in step 801, the receive end determines a pdf of a noise to be applied at a single tone. For example, the pdf of the noise is given as in Equation 3 above. To determine the pdf of the noise, the receive end has to determine a shape parameter $\alpha$ and a scale parameter $\beta$. According to an exemplary embodiment of the present invention, the shape parameter $\alpha$ and the scale parameter $\beta$ can be calculated considering a channel environment, or can be defined as a fixed value for the sake of reduction of the number of operations. For example, the shape parameter $\alpha$ and the scale parameter $\beta$ can be calculated as in Equation 8 above. Further, to more reduce the number of operations, the receive end can substitute the pdf of the noise with a polynomial expression in the entire section or partial section of the pdf.

Next, the receive end proceeds to step 803 and calculates a probability value of when a QAM symbol has been transmitted at a tone to which the QAM symbol is mapped upon symbol candidate-n transmission. The symbol candidate denotes one of transmissible TQAM symbols. For example, eight symbols illustrated in FIG. 5 become the symbol candidates. Here, the 'n', an index of the symbol candidate, can be a bit value represented by a corresponding TQAM symbol. For example, referring to FIG. 5, a symbol candidate-0 is given as in FIG. 5(a). In this case, a QAM symbol is '$\rho_2+j\rho_2$' and is mapped to the first tone, so the receive end calculates a probability that the '$\rho_2+j\rho_2$' would be transmitted at the first tone. In other words, the receive end determines a probability that the same noise as a value subtracting the '$\rho_2+j\rho_2$' from a reception signal of the first tone is generated, using the pdf of the noise.

After that, the receive end proceeds to step 805 and calculates a probability value of when a QAM symbol has not been transmitted at a tone to which the QAM symbol is not mapped upon symbol candidate-n transmission. The symbol candidate denotes one of transmissible TQAM symbols. For example, in a case of 8-TQAM, eight symbols illustrated in FIG. 5 become the symbol candidates. Here, the 'n', an index of the symbol candidate, can be a bit value represented by a corresponding TQAM symbol. For example, referring to FIG. 5, a symbol candidate-0 is given as in FIG. 5(a). In this case, a QAM symbol is '$\rho_2+j\rho_2$' and is mapped to the first tone, so the receive end calculates a probability that '0' would be transmitted at the second tone. In other words, the receive end determines a probability that the same noise as a reception signal of the first tone is generated, using the pdf of the noise. When TQAM uses three or more tones, step 805 is repeatedly performed for each of the remnant tones excepting a tone at which a QAM symbol is transmitted.

Next, the receive end proceeds to step 807 and multiplies all of the probability values calculated in step 803 and step 805. In other words, by multiplying the probability values calculated at the respective tones, the receive end determines a probability that a TQAM symbol candidate-n would be transmitted. A TQAM symbol has a form in which a corresponding QAM symbol is transmitted through one tone and no symbol is transmitted through the remnant at least one tone. Accordingly, a transmission probability of a specific TQAM symbol can be expressed by a multiplication of probability values independently calculated at respective tones.

After that, the receive end proceeds to step 809 and determines if calculation of probability values of all symbol candidates has been completed. For example, as in FIG. 5, the receive end determines if probability values of respective eight TQAM symbol candidates have been determined. If the calculation of the probability values has not been completed, the receive end proceeds to step 811 and increases the 'n' by '1' and then, returns to step 803. Accordingly, step 803 and step 805 are repeatedly performed as many as the number of TQAM symbol candidates.

If the calculation of the probability values has been completed, the receive end proceeds to step 813 and generates a decoding metric using the probability values of the respective symbol candidates. For example, if the decoding metric is an LLR, the receive end selects a probability value of one TQAM symbol as a reference, and determines the ratio of probability values of other TQAM symbols to the selected probability value.

The procedure illustrated in FIG. 8 is an exemplary embodiment about generating of a decoding metric for a TQAM symbol. According to another exemplary embodiment of the present invention, the receive end can generate a decoding metric for a TF-mixed-QAM symbol. In this case, through a procedure similar to FIG. 8, the receive end can generate the decoding metric for the TF-mixed-QAM symbol. In a case of the TF-mixed-QAM symbol, a probability value of one TF-mixed-QAM symbol is determined by multiplying probability values per tone as many as {number of tones of time axis×number of tones of frequency axis}.

Figure 9:
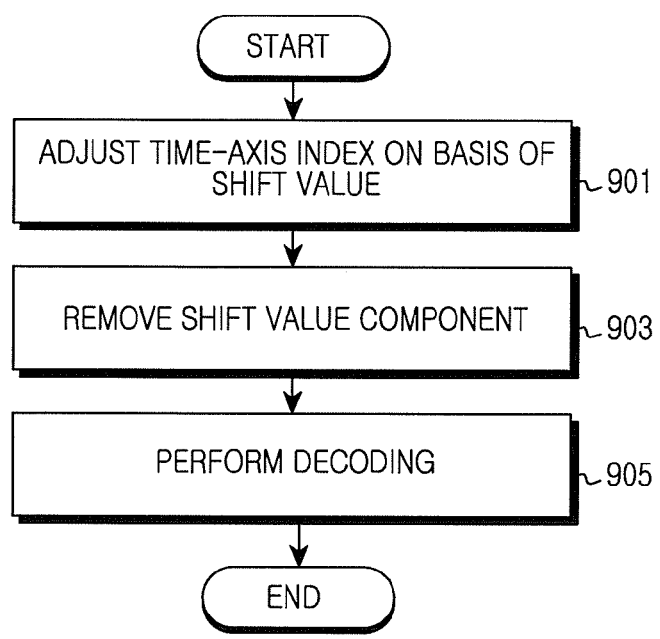
FIG. 9 is a flowchart illustrating an information bit stream determining procedure of a receive end in a wireless communication system according to an exemplary embodiment of the present invention.

FIG. 9 illustrates an information bit stream determining procedure of a receive end in a wireless communication system according to an exemplary embodiment of the present invention. The procedure illustrated in FIG. 9 can be performed in parallel with the procedure of FIG. 8, or in series.

Referring to FIG. 9, in step 901, the receive end adjusts a time-axis index of a QAM symbol on the basis of a shift value. In detail, the receive end detects at least one bit indicating the shift value in the QAM symbol constructing a TQAM symbol, and determines the time-axis index corresponding to the QAM symbol according to the shift value. At this time, to detect the shift value, the receive end determines transmission probability values of candidate symbols having considered only the at least one bit indicating the shift value, and detects the shift values on the basis of the symbol probability values having considered only the shift value. Here, the symbol probability values having considered only the shift value can be determined by summing up probability values of symbol candidates having the same bit indicating the shift value among probability values of the respective entire symbols. And then, the receive end adjusts the time-axis index. For example, if the detected shift value is equal to '10', the receive end reverse-shifts a time-axis index corresponding to probability values or decoding metrics for a corresponding QAM symbol, as much as a quantity corresponding to the shift value '10'.

Next, the receive end proceeds to step 903 and removes a shift value component from the probability values or decoding metrics of the symbol candidates. At this time, the removing of the shift value component can be performed about the probability value or decoding metric. In a case of removing the shift value component from the decoding metric, the receive end generates per-bit decoding metrics, and removes a decoding metric of the at least one bit indicating the shift value from the per-bit decoding metrics. Alternately, in a case of removing the shift value component from the probability value, at the time of generating a probability value of a TQAM symbol, the receive end sums up probability values of symbol candidates whose values of the remnant bits excepting the bit indicating the shift value are the same as each other.

After that, the receive end proceeds to step 905 and performs decoding. In other words, the receive end performs the decoding using the decoding metrics removing the shift value component. As a result, the receive end can restore the original bit stream.

Figure 10:
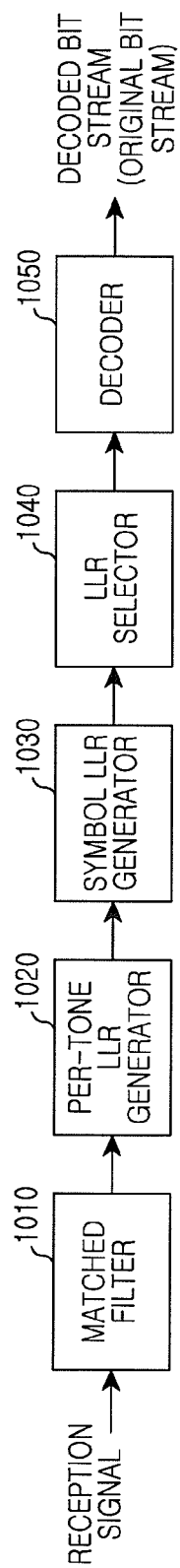
FIG. 10 is a block diagram illustrating a receiver structure for TQAM symbol decoding in a wireless communication system according to an exemplary embodiment of the present invention.

FIG. 10 illustrates a receiver structure for TQAM symbol decoding in a wireless communication system according to an exemplary embodiment of the present invention. FIG. 10 illustrates a functional structure of a receiver for TQAM symbol decoding.

Referring to FIG. 10, the receiver includes a matched filter 1010, a per-tone LLR generator 1020, a symbol LLR generator 1030, an LLR selector 1040, and a decoder 1050.

The matched filter 1010 converts an analog reception signal into a digital signal. Also, the matched filter 1010 more accurately restores a pulse by compressing a noise. That is, the matched filter 1010 increases a Signal to Noise Ratio (SNR) of a signal. However, the matched filter 1010 can be excluded if the receiver follows an OFDM method.

The per-tone LLR generator 1020 generates an LLR of each tone belonging to a range of a TQAM symbol. And, the symbol LLR generator 1030 generates a symbol LLR of the TQAM symbol, by multiplying the LLRs of the respective tones generated by the per-tone LLR generator 1020. For example, the per-tone LLR generator 1020 and the symbol LLR generator 1030 can perform the procedure of FIG. 8.

The LLR selector 1040 removes a partial LLR corresponding to a bit indicating a shift value from the LLR generated by the symbol LLR generator 1030, and outputs the remnant LLR. The decoder 1050 restores the original bit stream by performing decoding using the LLR removing the partial LLR corresponding to at least one bit indicating the shift value.

During the aforementioned original bit stream restoring process, the symbol LLR generator 1030 adjusts a time-axis index of a QAM symbol on the basis of a shift value included in each TQAM symbol. That is, the symbol LLR generator 1030 determines symbol probability values having considered only at least one bit indicating the shift value, and generates LLRs about the shift value. And, after detecting the shift value using the LLRs, the decoder 1050 provides the shift value to the symbol LLR generator 1030. According to this, the symbol LLR generator 1030 adjusts the time-axis index of the QAM symbol on the basis of the shift value.

In the exemplary embodiment illustrated in FIG. 10, the LLR selector 1040 removes the LLR of the at least one bit indicating the shift value. But, according to another exemplary embodiment of the present invention, instead of removing a decoding metric of a partial bit after LLR generation, at the time of determining a probability value for a TQAM symbol, the receive end can exclude at least one bit indicating the shift value. For this, the per-tone LLR generator 1020 or the symbol LLR generator 1030 combines LLRs of symbols whose values of the remnant bits excepting the bit indicating the shift value are the same as each other. In this case, a decoding metric already removing the shift value component is obtained and therefore, the LLR selector 1040 can be excluded.

In certain embodiments, a subscriber station and a base station described in US20100172290 can be used for the embodiments of the present disclosure, which is incorporated by reference in its entirety.

Figure 11:
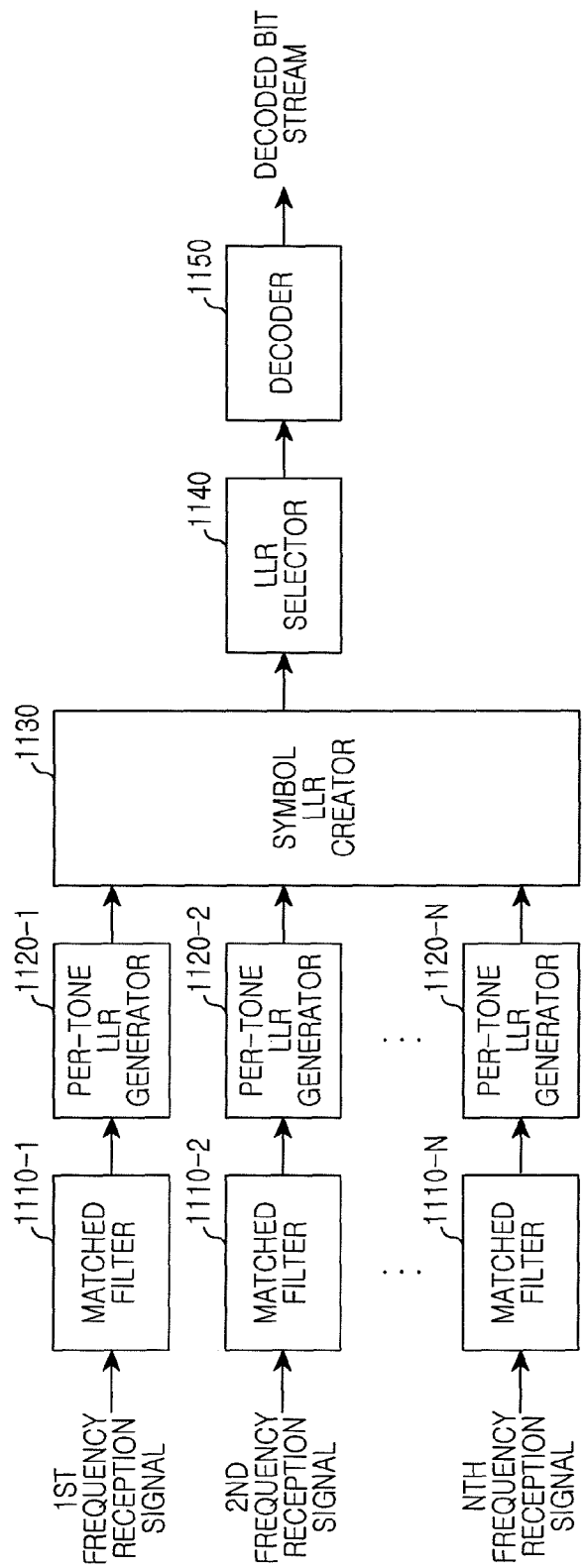
FIG. 11 is a block diagram illustrating a receiver structure for Time-Frequency-mixed-QAM (TF-mixed-QAM) symbol decoding in a wireless communication system according to an exemplary embodiment of the present invention.

FIG. 11 illustrates a receiver structure for TF-mixed QAM symbol decoding in a wireless communication system according to an exemplary embodiment of the present invention. FIG. 11 illustrates a functional structure of a receiver for TF-mixed-QAM symbol decoding. Compared to the receiver illustrated in FIG. 10, the receiver illustrated in FIG. 11 has a separate matched filter and per-tone LLR generating means by each frequency.

Referring to FIG. 11, the receiver includes matched filters 1110-1 to 1110-N, per-tone LLR generators 1120-1 to 1120-N, a symbol LLR generator 1130, an LLR selector 1140, and a decoder 1150.

The matched filters 1110-1 to 1110-N convert an analog reception signal received through each frequency into a digital signal. Also, the matched filters 1110-1 to 1110-N more accurately restore pulses by compressing noises. That is, the matched filters 1110-1 to 1110-N increase SNRs of signals. However, the matched filters 1110-1 to 1110-N can be excluded if the receiver follows an OFDM method.

The per-tone LLR generators 1120-1 to 1120-N generate an LLR of each tone belonging to a range of a TF-mixed-QAM symbol of each frequency. And, the symbol LLR generator 1130 generates a symbol LLR of the TF-mixed-QAM symbol, by multiplying the LLRs of the respective tones generated by the per-tone LLR generators 1120-1 to 1120-N. For example, the per-tone LLR generators 1120-1 to 1120-N and the symbol LLR generator 1130 can perform a procedure similar to FIG. 8.

The LLR selector 1140 removes a partial LLR corresponding to a bit indicating a shift value from the LLR generated by the symbol LLR generator 1130, and outputs the remnant LLR. The decoder 1150 restores the original bit stream by performing decoding using the LLR removing the partial LLR corresponding to at least one bit indicating the shift value.

During the aforementioned original bit stream restoring process, the symbol LLR generator 1130 adjusts a time-axis index of a QAM symbol on the basis of a shift value included in each TF-mixed-QAM symbol. That is, the symbol LLR generator 1130 determines symbol probability values having considered only at least one bit indicating the shift value, and generates LLRs about the shift value. And, after detecting the shift value using the LLRs, the decoder 1150 provides the shift value to the symbol LLR generator 1130. According to this, the symbol LLR generator 1130 adjusts the time-axis index of the QAM symbol on the basis of the shift value.

In the exemplary embodiment illustrated in FIG. 11, the LLR selector 1140 removes the LLR of the at least one bit indicating the shift value. But, according to another exemplary embodiment of the present invention, instead of removing a decoding metric of a partial bit after LLR generation, at the time of determining a probability value for a TF-mixed-QAM symbol, the receive end can exclude at least one bit indicating the shift value. For this, the per-tone LLR generators 1120-1 to 1120-N or the symbol LLR generator 1130 combines LLRs of symbols whose values of the remnant bits excepting the bit indicating the shift value are the same as each other. In this case, a decoding metric already removing the shift value component is obtained and therefore, the LLR selector 1140 can be excluded.

Figure 12:
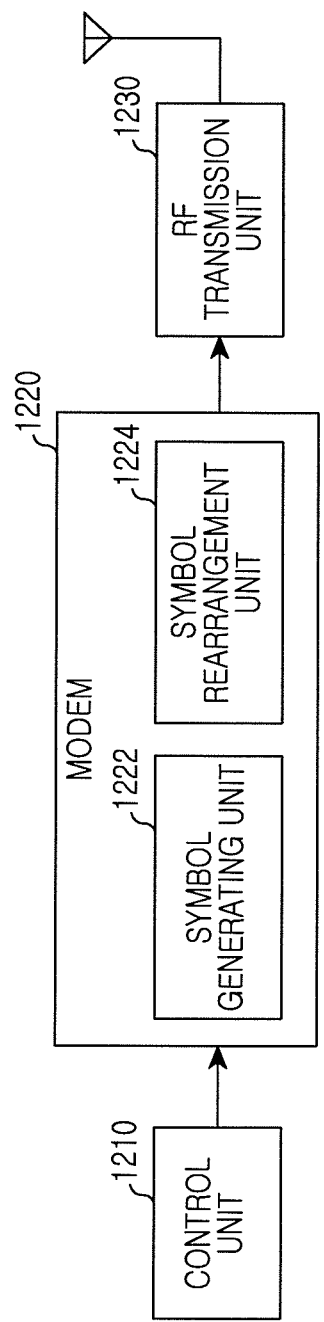
FIG. 12 is a block diagram illustrating a construction of a transmit end in a wireless communication system according to an exemplary embodiment of the present invention.

FIG. 12 illustrates a construction of a transmit end in a wireless communication system according to an exemplary embodiment of the present invention.

Referring to FIG. 12, the transmit end includes a control unit 1210, a modem 1220, and an RF transmission unit 1230.

The control unit 1210 controls the general operations of the transmit end. For example, the control unit 1210 transmits a signal through the modem 1220 and the RF transmission unit 1230. Also, the control unit 1210 determines setting necessary for coding and modulation of the modem 1220. The control unit 1210 can include at least one processor.

The modem 1220 converts a bit stream into a baseband signal according to a physical layer standard of the system. For example, if following an OFDM method, the modem 1220 generates complex symbols by coding and modulating a transmission bit stream, maps the complex symbols to time resources, and then constructs OFDM symbols through IFFT operation and Cyclic Prefix (CP) insertion.

Particularly, according to an exemplary embodiment of the present invention, the modem 1220 generates a TQAM symbol or a TF-mixed-QAM symbol. For this, the modem 1220 includes a symbol generating unit 1222 and a symbol rearrangement unit 1224. The symbol generating unit 1222 generates a TQAM symbol or a TF-mixed-QAM symbol. In other words, the symbol generating unit 1222 generates a TQAM symbol that is identified by a phase and size of a symbol and a position of a mapped time resource, or a TF-mixed-QAM symbol that is identified by a phase and size of a symbol, a position of a mapped time resource, and a position of a frequency resource. The symbol rearrangement unit 1224 uniformizes QAM symbols constructing the TQAM symbol or TF-mixed-QAM symbol at a time axis. In other words, the symbol rearrangement unit 1224 shifts at the time axis at least one QAM symbol for the sake of the time-axis uniformizing of the QAM symbols. And, the symbol rearrangement unit 1224 changes a constellation point of the QAM symbol so as to represent a shift value. For example, the symbol rearrangement unit 1224 performs step 701 to step 707 among the procedure illustrated in FIG. 7. An operation of the symbol rearrangement unit 1224 is described in detail as follows.

The symbol rearrangement unit 1224 groups TQAM symbols or TF-mixed-QAM symbols, and analyzes a time-axis distribution of QAM symbols within a group. As the analysis result, if the time-axis distribution of the QAM symbols within the group is not uniform, the symbol rearrangement unit 1224 uniformizes the time-axis distribution of the QAM symbols within the group, by rearranging the QAM symbols within the group at the time axis. For this, the symbol rearrangement unit 1224 shifts at the time axis at least one QAM symbol within a range of TQAM symbol or TF-mixed-QAM symbol. Next, the symbol rearrangement unit 1224 changes a constellation point of each QAM symbol on the basis of a shift value of each QAM symbol. In other words, the symbol rearrangement unit 1224 performs constellation point readjustment so as to add a bit indicating the shift value. At this time, the symbol rearrangement unit 1224 changes even a constellation point of a non-shifted QAM symbol so as to indicate that a shift value of the non-shifted QAM symbol is equal to '0'.

The RF transmission unit 1230 performs a function for transmitting a signal through a wireless channel, such as signal band conversion, amplification and the like. That is, the RF transmission unit 1230 up converts a baseband signal provided from the modem 1220 into an RF band signal and then, transmits the RF band signal through an antenna. For example, the RF transmission unit 1230 can include an amplifier, a mixer, an oscillator, a Digital to Analog Converter (DAC), and the like. In FIG. 12, only one antenna is illustrated, but the transmit end can have a plurality of antennas.

Figure 13:
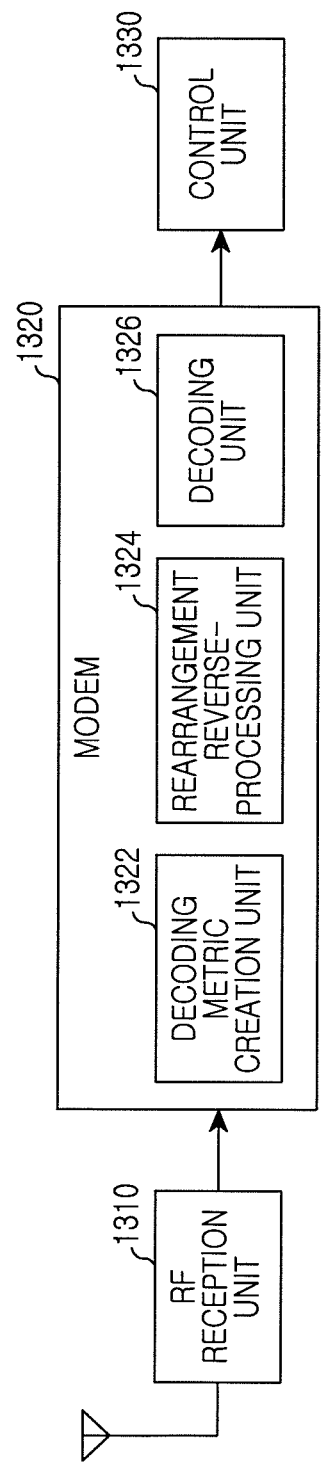
FIG. 13 is a block diagram illustrating a construction of a receive end in a wireless communication system according to an exemplary embodiment of the present invention.

FIG. 13 illustrates a construction of a receive end in a wireless communication system according to an exemplary embodiment of the present invention.

Referring to FIG. 13, the receive end includes an RF reception unit 1310, a modem 1320, and a control unit 1330.

The RF reception unit 1310 performs a function for receiving a signal through a wireless channel, such as reception signal amplification, band conversion and the like. That is, the RF reception unit 1310 amplifies an RF band signal received through an antenna and then, down converts the RF band signal into a baseband signal. For example, the RF reception unit 1310 can include an amplifier, a mixer, an oscillator, an Analog to Digital Converter (ADC), and the like. In FIG. 13, only one antenna is illustrated, but the receive end can have a plurality of antennas.

The modem 1320 converts a baseband signal into a bit stream according to a physical layer standard of the system. For example, if following an OFDM method, the modem 1320 divides in a unit of OFDM symbol a baseband signal provided from the RF reception unit 1310, restores signals mapped to time resources through Fast Fourier Transform (FFT) operation, and then restores a reception bit stream through demodulation and decoding. Particularly, according to an exemplary embodiment of the present invention, the modem 1320 demodulates and decodes a TQAM symbol or a TF-mixed-QAM symbol. For this, the modem 1320 includes a decoding metric generating unit 1322, a rearrangement reverse-processing unit 1324, and a decoding unit 1326. The decoding metric generating unit 1322 generates a decoding metric for decoding the TQAM symbol or the TF-mixed-QAM symbol. The rearrangement reverse-processing unit 1324 restores a symbol deformation of a transmit end caused by time-axis shifting of each QAM symbol, for the sake of uniformizing the time-axis distribution of the QAM symbol. In other words, the rearrangement reverse-processing unit 1324 adjusts a time-axis index of the QAM symbol on the basis of the shift value, and removes a shift value component from probability values or decoding metrics for a TQAM symbol. The decoding unit 1326 restores the original bit stream using the decoding metric.

For example, the decoding metric generating unit 1322 performs the procedure illustrated in FIG. 8. An operation of the decoding metric generating unit 1322 is described in detail as follows. First, the decoding metric generating unit 1322 determines a pdf of a noise to be applied at a single tone. To determine the pdf of the noise, the decoding metric generating unit 1322 has to determine a shape parameter α and a scale parameter β. According to an exemplary embodiment of the present invention, the shape parameter α and the scale parameter β can be calculated considering a channel environment, or can be defined as a fixed value for the sake of reduction of the number of operations. At this time, the decoding metric generating unit 1322 can substitute the pdf of the noise with a polynomial expression in the entire section or partial section of the pdf. And, the decoding metric generating unit 1322 calculates a probability value of when a QAM symbol has been transmitted at a tone to which the QAM symbol is mapped upon symbol candidate-n transmission, and calculates a probability value of when the QAM symbol has not been transmitted at at least one tone to which the QAM symbol is not mapped. Next, by multiplying all of probability values calculated about respective tones, the decoding metric generating unit 1322 determines a probability value in which a TQAM symbol candidate-n would be transmitted. The decoding metric generating unit 1322 repeatedly performs the aforementioned probability value calculation and multiplication for each TQAM symbol candidate and then, generates a decoding metric using the probability values of the respective symbol candidates. For example, if the decoding metric is an LLR, the decoding metric generating unit 1322 selects as a reference a probability value of one TQAM symbol, and determines the ratio of probability values of other TQAM symbols to the selected probability value. The aforementioned operation of the decoding metric generating unit 1322 can be identically applied even to decoding metric generation for a TF-mixed-QAM symbol.

For example, the rearrangement reverse-processing unit 1324 and the decoding unit 1326 perform step 901 and step 903 illustrated in FIG. 9. In detail, the rearrangement reverse-processing unit 1324 determines symbol probability values having considered only at least one bit indicating the shift value, and generates decoding metrics using the symbol probability values. And, the decoding unit 1326 detects the shift values using the decoding metrics, and provides the shift values to the rearrangement reverse-processing unit 1324. According to this, the rearrangement reverse-processing unit 1324 reverse-shifts indexes of a time-axis tone corresponding to probability values or decoding metrics for a corresponding QAM symbol, as much as a quantity corresponding to the shift value. And, the rearrangement reverse-processing unit 1324 removes a shift value component from the probability values or decoding metrics of the symbol candidates. At this time, the removing of the shift value component can be performed for the probability value or decoding metric. In a case of removing the shift value component from the decoding metric, the rearrangement reverse-processing unit 1324 generates per-bit decoding metrics, and removes a decoding metric of at least one bit indicating the shift value from the per-bit decoding metrics. Alternately, in a case of removing the shift value component from the probability value, at the time of generating a probability value of a TQAM symbol, the rearrangement reverse-processing unit 1324 sums up probability values of symbol candidate whose values of the remnant bits excepting a bit indicating the shift value are the same as each other.

The control unit 1330 controls the general operations of the receive end. For example, the control unit 1330 receives a signal through the modem 1320 and the RF reception unit 1310. Also, the control unit 1330 determines setting necessary for demodulation and decoding of the modem 1320. The control unit 1330 can include at least one processor.

Exemplary embodiments of the present invention can support a modulation/demodulation technique of enabling a noise and interference signal to follow a non-Gaussian distribution in a wireless communication system. Further, the exemplary embodiments of the present invention can solve a problem of symbol concentration at the time of applying a TQAM technique.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for operating a transmit end in a wireless communication system, the method comprising:
    generating a transmission symbol by modulating bits, wherein a first part of the bits is mapped into a Quadrature Amplitude Modulation (QAM) symbol and a second part of the bits is mapped into a position of the QAM in a time-axis;
    shifting the QAM symbol in the time-axis;
    adjusting a constellation point of the QAM symbol to add at least one additional bit indicating a position of the QAM symbol prior to being shifted in the time axis; and
    transmitting the transmission symbol.

2. The method of claim 1, wherein shifting the QAM symbol comprises:

uniformizing a time-axis distribution of QAM symbols of a plurality of transmission symbols including the transmission symbol.

3. The method of claim 1, wherein the transmission symbol is identified by a combination of the QAM symbol, the position of a time resource to which the QAM symbol is mapped, and a position of a frequency resource to which the QAM symbol is mapped.

4. A method for operating a receive end in a wireless communication system, the method comprising:
  receiving a reception symbol representing bits, wherein a first part of the bits is mapped into a Quadrature Amplitude Modulation (QAM) symbol and a second part of the bits is mapped into a position of the QAM symbol in a time-axis;
  determining at least one additional bit that is represented by the QAM symbol and indicates a position of the QAM symbol prior to being shifted in the time axis by a transmit end;
  restoring a constellation point and the position of the QAM symbol based on the at least one additional bit; and
  decoding the reception symbol.

5. The method of claim 4, wherein restoring the position of the QAM symbol comprises:
  adjusting a time-axis indices of probability values, decoding metrics, or, reception signal values based on the at least one additional bit; and
  removing a component of the at least one additional bit from the probability values or the decoding metrics.

6. The method of claim 5, wherein removing the component of the at least one additional bit comprises:
  generating per-bit decoding metrics for the reception symbol; and
  removing at least one decoding metric of at least one additional bit from the per-bit decoding metrics.

7. The method of claim 5, wherein removing the component of the at least one additional bit comprises:
  summing up probability values of symbol candidates whose values of the remnant bits excepting the at least one additional bit are a same as each other, among probability values of reception symbol candidates for the reception symbol.

8. The method of claim 4, wherein the reception symbol is identified by a combination of the QAM symbol, the position of a time resource to which the QAM symbol is mapped, and a position of a frequency resource to which the QAM symbol is mapped.

9. The method of claim 4, further comprising:
  generating decoding metrics,
  wherein the generating the decoding metrics comprises:
    calculating a probability that the QAM symbol is transmitted through a tone in which a QAM symbol is mapped in first reception symbol candidate;
    calculating a probability that the QAM symbol is not transmitted through at least one remnant tone; and
    determining a transmission probability of the first reception symbol candidate by multiplying probabilities calculated at respective tones.

10. The method of claim 9, wherein generating the decoding metrics comprises:
  determining a transmission probabilities of each of reception symbol candidates by determining per-tone probabilities and multiplying the per-tone probabilities for each of the reception symbol candidates.

11. The method of claim 10, wherein generating the decoding metrics comprises:
  generating the decoding metrics using the transmission probabilities of each of the reception symbol candidates.

12. The method of claim 9, wherein generating the decoding metrics comprises determining a probability density function (pdf) of a noise.

13. The method of claim 12, wherein the pdf of the noise follows a Gaussian distribution.

14. The method of claim 12, wherein the pdf of the noise is given as in a numerical equation below:

$$f_{\hat{Z}}(Z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right)$$

where $f_{\hat{Z}}$ is a pdf of a noise, z is a variable indicating the noise, $\alpha$ is a shape parameter and expresses the extent of non-Gaussian, $\beta$ is a scale parameter and expresses a variance, and $\Gamma$ is a Gamma function and is defined as $\Gamma(z) \triangleq \int_0^\infty t^{z-1}\exp(-t)dt$.

15. The method of claim 14, wherein the shape parameter is set to a predefined value.

16. The method of claim 14, wherein the shape parameter is set to one value most approximating to an estimated value among a predefined number of candidate values.

17. The method of claim 12, wherein the pdf of the noise is a function of substituting the entire or partial section of the pdf with a polynomial expression.

18. An apparatus for a transmit end in a wireless communication system, the apparatus comprising: a modem configured to:
  generate a transmission symbol modulating bits, wherein a first part of the bits is mapped into a Quadrature Amplitude Modulation (QAM) symbol and a second part of the bits is mapped into a position of the QAM symbol in a time-axis;
  shift the QAM symbol in the time axis; and
  adjust a constellation point of the QAM symbol to add at least one additional bit indicating a position of the QAM symbol prior to being shifted in the time axis; and
  a Radio Frequency (RF) transmission unit configured to transmit the transmission symbol.

19. The apparatus of claim 18, wherein the modem is configured to uniformize a time-axis distribution of QAM symbols of a plurality of transmission symbols including the transmission symbol.

20. The apparatus of claim 18, wherein the transmission symbol is identified by a combination of the QAM symbol, the position of a time resource to which the QAM symbol is mapped, and a position of a frequency resource to which the QAM symbol is mapped.

21. An apparatus for a receive end in a wireless communication system, the apparatus comprising:
  a reception unit configured to receive a reception symbol representing bits, wherein a first part of the bits is mapped into a Quadrature Amplitude Modulation (QAM) symbol and a second part of the bits is mapped into a position of the QAM symbol in a time-axis; and
  a modem configured to:
    determine at least one additional bit that is represented by the QAM symbol and indicates a position of the QAM symbol prior to being shifted in the time axis by a transmit end;
    restore a constellation point and the position of the QAM symbol based on the at least one additional bit; and,
    decode the reception symbol.

22. The apparatus of claim 21, wherein, in order to restore the position of the QAM symbol, the modem is configured to adjust a time-axis indices of probability values, decoding metrics, or, reception signal values based on the at least one additional bit, and, to removes a component of the at least one additional bit from the probability values or the decoding metrics.

23. The apparatus of claim 22, wherein the modem is configured to generate per-bit decoding metrics for the reception symbol, and to remove at least one decoding metric of at least one additional bit indicating the per-bit decoding metrics.

24. The apparatus of claim 22, wherein the modem is configured to sum up probability values of symbol candidates whose values of the remnant bits excepting the at least one additional bit are the same as each other, among probability values of reception symbol candidates for the reception symbol.

25. The apparatus of claim 21, wherein the reception symbol is identified by a combination of the QAM symbol, the position of a time resource to which the QAM symbol is mapped, and a position of a frequency resource to which the QAM symbol is mapped.

26. The apparatus of claim 21, wherein, in order to generate decoding metrics, the modem is configured to calculate a probability that the QAM symbol is transmitted through a first tone in which a QAM symbol is mapped in a first reception symbol candidate, to calculate a probability that the QAM symbol is not transmitted through at least one remnant at least one tone, and to determine a transmission probability of the first reception symbol candidate by multiplying probabilities calculated at respective tones.

27. The apparatus of claim 26, wherein, in order to generate the decoding metrics, the modem is configured to determine transmission probabilities of each of reception symbol candidates by determining per-tone probabilities and multiplying the per-tone probabilities for each of the reception symbol candidates.

28. The apparatus of claim 27, wherein, in order to generate the decoding metrics, the modem is configured to generate the decoding metrics using the transmission probabilities of each of the reception symbol candidates.

29. The apparatus of claim 26, wherein the modem is configured to determine a probability density function (pdf) of a noise.

30. The apparatus of claim 29, wherein the pdf of the noise follows a Gaussian distribution.

31. The apparatus of claim 29, wherein the pdf of the noise is given as in a numerical equation below:

$$f_{\tilde{Z}}(Z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right)$$

where $f_{\tilde{Z}}$ is a pdf of a noise, z is a variable indicating the noise, $\alpha$ is a shape parameter and expresses the extent of non-Gaussian, $\beta$ is a scale parameter and expresses a variance, and $\Gamma$ is a Gamma function and is defined as $\Gamma(z) \triangleq \int_0^\infty t^{z-1} \exp(-t) dt$.

32. The apparatus of claim 31, wherein the shape parameter is set to a predefined value.

33. The apparatus of claim 31, wherein the shape parameter is set to one value most approximating to an estimated value among a predefined plurality of candidate values.

34. The apparatus of claim 29, wherein the pdf of the noise is a function of substituting the entire or partial section of the pdf with a polynomial expression.

* * * * *